(12) United States Patent
Sahotra et al.

(10) Patent No.: US 8,149,863 B1
(45) Date of Patent: Apr. 3, 2012

(54) DETECTION OF STRONG HIGH FREQUENCY SINUSOIDAL INTERFERENCE IN WIRELESS COMMUNICATIONS

(75) Inventors: Atul Sahotra, Sunnyvale, CA (US); Kedar Shirali, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1432 days.

(21) Appl. No.: 11/351,936

(22) Filed: Feb. 9, 2006

Related U.S. Application Data

(60) Provisional application No. 60/677,220, filed on May 2, 2005.

(51) Int. Cl.
*H04L 12/413* (2006.01)

(52) U.S. Cl. ............... 370/445; 375/343; 455/501

(58) Field of Classification Search .......... 370/431, 370/449, 450, 451, 452, 455, 229, 230, 230.1, 370/232, 445; 375/259, 260, 316, 346; 398/43, 398/98, 99; 455/1, 39, 63.1, 91, 114.2; 709/230, 709/232, 235
See application file for complete search history.

(56) References Cited

U.S. PATENT DOCUMENTS

| | | | | |
|---|---|---|---|---|
| 4,416,017 A | * | 11/1983 | Jasper et al. ............... | 375/346 |
| 4,965,792 A | * | 10/1990 | Yano ........................... | 370/445 |
| 5,257,257 A | * | 10/1993 | Chen et al. ................. | 370/441 |
| 5,903,597 A | * | 5/1999 | Pon ............................. | 375/150 |
| 5,940,399 A | * | 8/1999 | Weizman .................... | 370/445 |
| 7,342,876 B2 | * | 3/2008 | Bellur et al. ................ | 370/221 |
| 7,346,116 B2 | * | 3/2008 | Moher ......................... | 375/260 |
| 2003/0120809 A1 | * | 6/2003 | Bellur et al. ................ | 709/239 |
| 2004/0170237 A1 | * | 9/2004 | Chadha et al. .............. | 375/343 |
| 2005/0042998 A1 | * | 2/2005 | Renard et al. .............. | 455/296 |
| 2006/0135188 A1 | * | 6/2006 | Murty et al. ................ | 455/501 |
| 2007/0201588 A1 | * | 8/2007 | Loiseau et al. ............. | 375/346 |

OTHER PUBLICATIONS

"Part 11: Wireless LAN Medium Access Control (MAC) and Physical Layer (PHY) Specifications," ANSI/IEEE Std 802.11, 1999 ed., 1999, IEEE, New York, NY.

"Draft Supplement to Standard [for]: Part 11: Wireless LAN Medium Access Control (MAC) and Physical Layer (PHY) specifications: Further Higher-Speed Physical Layer Extension in the 2.4 GHz Band," IEEE Std 802.11g/D1.1, Jan. 2002: (Supplement to ANSI/IEEE Std 802.11, 1999 ed.), Jan. 2002, IEEE, New York, NY.

"Part 11: Wireless LAN Medium Access Control (MAC) and Physical Layer (PHY) specifications: Amendment 4: Further Higher Data Rate Extension in the 2.4 GHz Band," IEEE Std 802.11g-2003, Jun. 27, 2003, IEEE, New York, NY.

* cited by examiner

*Primary Examiner* — Seema S Rao
*Assistant Examiner* — Khoa Huynh

(57) ABSTRACT

A method is provided for controlling access to a wireless communications medium. The method includes: sampling RF activity on the medium; autocorrelating samples to produce a first value indicative of autocorrelation computed with a first delay substantially matching periodicity of a signal of interest and to produce a second value indicative of autocorrelation computed with a second delay different from the first delay; monitoring the first value to determine whether the first value is possibly indicative of the signal of interest; monitoring the second value to determine whether the second value is indicative of an interferer signal; and preventing transmission of an RF transmit signal on the medium in response to the first value indicating that activity on the medium includes the signal of interest when the second value indicates that activity on the medium does not include an interferer signal.

57 Claims, 14 Drawing Sheets

DETECTION OF STRONG HIGH FREQUENCY SINUSOIDAL INTERFERENCE IN WIRELESS COMMUNICATIONS

CROSS REFERENCE TO RELATED APPLICATION

The present application claims benefit of earlier filed provisional patent application, U.S. Application No. 60/677,220, filed on May 2, 2005, and entitled, "A Method to Detect Strong High. Frequency Sinusoidal Jamer in WLAN Systems," which is hereby incorporated by reference as if fully set forth herein.

BACKGROUND OF THE INVENTION

1. Field of the Invention

The invention relates in general to wireless communications, and more particularly to discriminating between a periodic interfering signal and a periodic signal of interest.

2. Description of the Related Art

Carrier Sense Multiple Access (CSMA) is a Media Access Control (MAC) protocol in which a communication node verifies the absence of other traffic before transmitting on a shared physical medium, such as a prescribed radio frequency (RF) band. A wireless communication node, for example, may comprise a device with a radio communication card. Carrier sense signifies that a communication node listens for a carrier wave transmitted by another node when trying to send its own transmission. The presence of a carrier on the medium indicates that the medium is busy, i.e. another node currently is transmitting. If a node that intends to transmit information senses a carrier on the medium, then that node waits for the transmission in progress to finish before initiating its own transmission.

CSMA with Collision Avoidance (CSMA/CA) is a protocol in which a communication, node (or station) that intends to transmit sends a jam signal. After waiting a sufficient time for all other nodes that may access the medium to receive the jam signal, the node transmits a data frame. Conversely, before a communication node transmits information onto the shared medium, it listens to determine whether a jam signal has been sent by another node. If it detects a jam signal then it delays its own transmission for a random amount of time before again trying to transmit onto the medium. The random delay causes different nodes to wait different periods of time before again trying to transmit and avoids two or more of them sensing the medium at the same time, finding the channel idle, transmitting simultaneously, and having their transmissions collide with each other.

A jam signal sent by a wireless communication node comprises a signal pattern that informs other nodes that they should postpone transmitting onto the communication medium. In a CSMA/CA network, a transmitting node typically transmits a jam signal as a preamble to a data packet. The sending node sends the jam signal before transmission of the actual data in order to inform other nodes that the sending node intends to transmit data onto the medium. A jam signal alerts other nodes to back off by different random intervals before transmitting data onto the medium. Backing off by different random amounts reduces the probability of a collision when these other nodes first attempt a transmission retry.

Environmental noise is a significant challenge in wireless communications networks. For example, frequencies emitted by a cordless phone, a microwave oven or other appliances can interfere with wireless communications, causing packet fragmentation and data corruption. Another major challenge may arise when multiple radio technologies operate in the same frequency band. Specifically, for example, both IEEE 802.11 (Wi-Fi) networks and 802.15 (Bluetooth) networks operate in the unlicensed 2.4 GHz Industrial Scientific Medical (ISM) frequency band, which can lead to signal interference and result in significant performance degradation when devices are co-located in the same environment.

Sinusoidal interferer signals or frequency tones can be especially problematic. For example, there exist wireless networks that employ a CSMA/CA protocol in which a jam signal comprises a prescribed periodic signal of interest. Stations on such networks transmit jam signals before transmitting data to warn other stations that a data transmission is in progress. Stations on such networks also listen for a jam signal transmitted onto the shared medium by other stations before transmitting their own data onto the medium. Stations detect the jam signal using autocorrelation techniques. If a station detects such a jam signal transmitted by another station, then it delays its own transmission by a time interval sufficient for the other data transmission to complete. Unfortunately, autocorrelation of a sinusoidal interferer signal (or tone) can produce a false detection of a jam signal causing a station to unnecessarily delay data transmission, which can result in reduced data throughput.

Thus, there has been a need to reduce the impact of periodic noise signals such as sinusoidal signals and tones upon the operation of wireless communications devices. The present invention meets this need.

SUMMARY OF THE INVENTION

In one aspect, an embodiment of the invention includes a method of controlling access to a wireless communications medium. RF activity on the medium is sampled. The samples are autocorrelated to produce a first running autocorrelation value indicative of autocorrelation computed with a first delay substantially matching periodicity of a signal of interest. The running first value is monitored to determine whether it is possibly indicative of the signal of interest, such as a periodic non-sinusoidal preamble of a data packet, for example. Samples also are autocorrelated to produce a second running autocorrelation value indicative of autocorrelation computed with a second delay different from the first delay. The running second value is monitored to determine whether the second value is indicative of an interferer signal, such as a sinusoidal interferer (SSI), for instance. Transmission of an RF transmit signal, such as a data packet, onto the medium is delayed in response to the first value indicating that activity on the medium includes the signal of interest during a time when the second value indicates that activity on the medium does not include an interferer signal.

In a further aspect the method of an embodiment of the invention, transmission of an RF transmit signal onto the medium is permitted in response to either, the first value indicating that activity on the medium does not include the signal of interest, or the first value indicating that activity on the medium possibly includes the signal of interest during a time when the second value indicates that activity on the medium includes an interferer signal.

Another aspect of an embodiment of the invention involves a wireless communication apparatus includes signal processing circuitry operable to produce a first running autocorrelation value indicative of autocorrelation of RF samples computed with a first delay substantially matching periodicity of a signal of interest and to monitor the first value to determine whether the first value is possibly indicative of the signal of interest. The signal processing circuitry is further operable to produce a second running autocorrelation value indicative of autocorrelation computed with a second delay different from the first delay and to monitor the second value to determine whether the second value is indicative of an interferer signal. Moreover, RF transmission control circuitry is operable to prevent transmission of an RF transmit signal on the medium in response to the first value indicating that activity on the medium includes the signal of interest when the second value indicates that activity on the medium does not include an interferer signal.

In a further aspect an apparatus of an embodiment of the invention, the RF transmission control circuitry is operable to permit transmission of an RF transmit signal onto the medium in response to either, the first value indicating that activity on the medium does not include the signal of interest, or the first value indicating that activity on the medium possibly includes the signal of interest during a time when the second value indicates that activity on the medium includes an interferer signal.

A still further aspect of the invention a wireless communication apparatus that includes means for producing a first running autocorrelation value indicative of autocorrelation of RF samples computed with a first delay substantially matching periodicity of a signal of interest means for producing a second running autocorrelation value indicative of autocorrelation computed with a second delay different from the first delay. Structure corresponding to the two means for correlating may include the programmable circuitry of a digital signal processor, for example, or alternatively, may include ASIC circuitry custom designed to implement the autocorrelation functions. The apparatus also includes means for monitoring the first value to determine whether the first value is possibly indicative of the signal of interest and means for monitoring the second value to determine whether the second value is indicative of an interferer signal. Structure corresponding to the two means for monitoring may include the programmable circuitry of a digital signal processor, for example, or alternatively, may include ASIC circuitry custom designed to implement the autocorrelation functions. The apparatus also includes means for preventing transmission of an RF transmit signal onto the medium in response to the first value indicating that activity on the medium includes the signal of interest when the second value indicates that activity on the medium does not include an interferer signal. Structure for implementing the means for preventing may include Media Access Controller (MAC) device, for example, which may be programmed in a processor or implemented as an ASIC device, for example. In a further aspect of the embodiment, means for preventing transmission of an RF is provided, which prevents transmission of an RF transmit signal on the medium in response to the first value indicating that activity on the medium includes the signal of interest when both the second value and the third value indicate that activity on the medium does not include an interferer signal. The structure for the means for preventing may be implemented as part of the MAC device.

Thus, comparison of two (or more) autocorrelation results, one computed using a delay substantially matched to a periodicity of an RF signal of interest and the another computed using a different delay, can be used to determine whether an RF signal detected on a wireless communication medium is the signal of interest or an interferer. These and other features and advantages of the invention will be understood from the following description of embodiments thereof in conjunction with the appended drawings.

DETAILED DESCRIPTION OF THE PREFERRED EMBODIMENTS

The following description is presented to enable any person skilled in the art to make and use a novel apparatus and method to discriminate between a signal of interest, such as a periodic jam signal, and one or more periodic interference signals, such as a strong sinusoidal interferer signal, in accordance with the an embodiment of the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
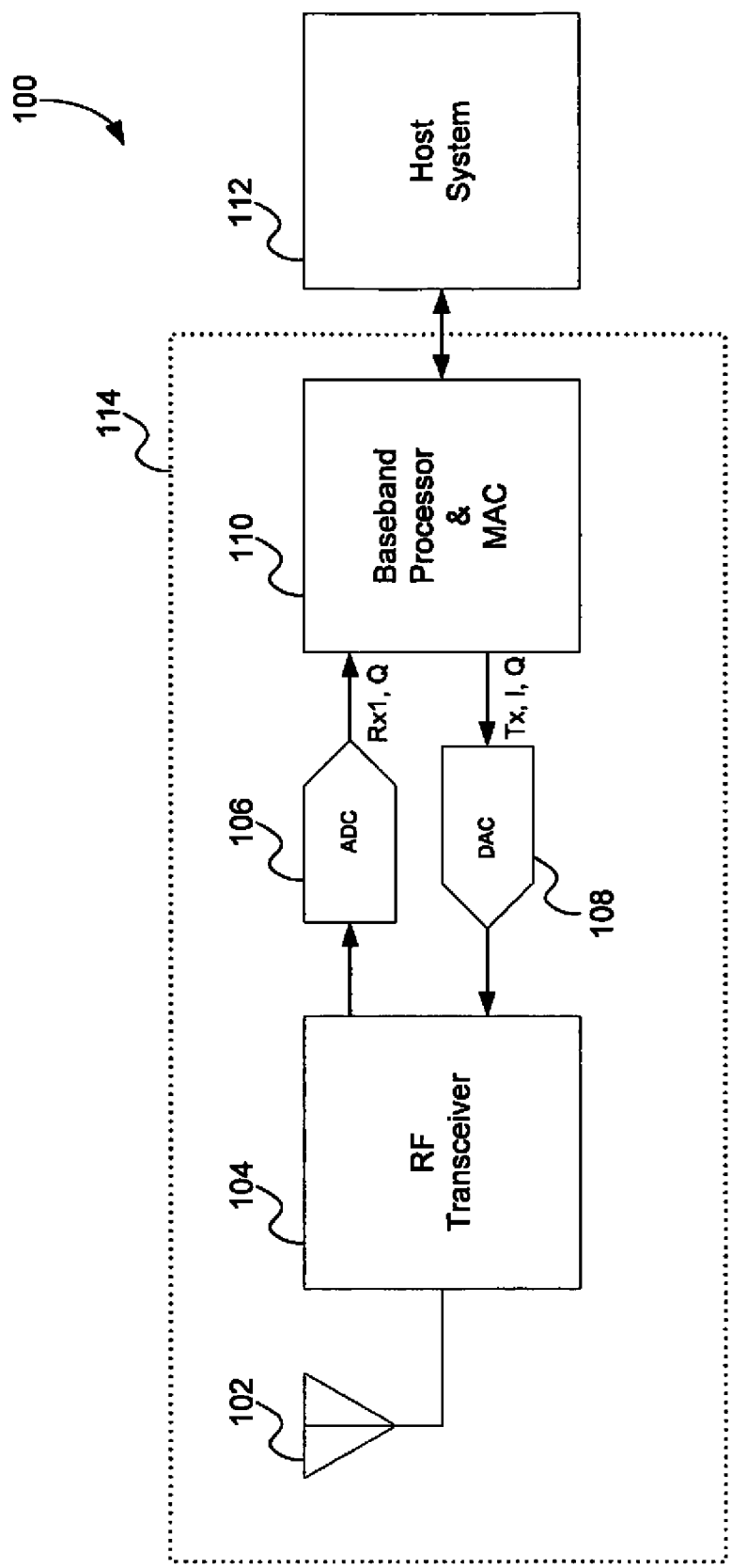
FIG. 1 is an illustrative block diagram of a wireless communications station that implements a system and method in accordance with an embodiment of the invention.

FIG. 1 is an illustrative block diagram of a wireless communications station 100 that implements an apparatus and method in accordance with an embodiment of the invention. In one embodiment, the station 100 is suitable for use as a node in a wireless local area network (WLAN). The station 100 includes WLAN circuitry indicated generally within dashed lines 114 and a host system 112, such as a personal computer, for example. More particularly, the station 100 includes an antenna 102, an RF transceiver section 104, analog-to-digital converter circuitry (ADC) 106, digital-to-analog converter circuitry (DAC) 108, a baseband processor and MAC section (BPMAC) 110 and a host system 112. The antenna 102 radiates RF electromagnetic waves encoded with information during transmission and receives RF electromagnetic waves encoded with information during reception. The RF transceiver section 104 filters and amplifies RF signals and performs conversions between RF and IF (intermediate frequency) to generate I and Q (in-phase and quadrature) data for the ADC 106 and DAC 108. The BPMAC section 110 modulates and demodulates I and Q data, performs carrier sensing, transmission, and receiving of frames. The BPMAC section 110 implements a CSMA/CA protocol in which the station 100 transmits a jam signal prior to sending a data packet. Conversely, in accordance with the protocol, the station 100 listens on the medium for transmission of a jam signal by another station and delays transmission of its own data packet if it detects a jam signal. In one embodiment, the BPMAC section 110 implements Orthogonal Frequency Division Multiplexing (OFDM) modulation compliant with the IEEE Standard 802.11g (2003).

Figure 2:
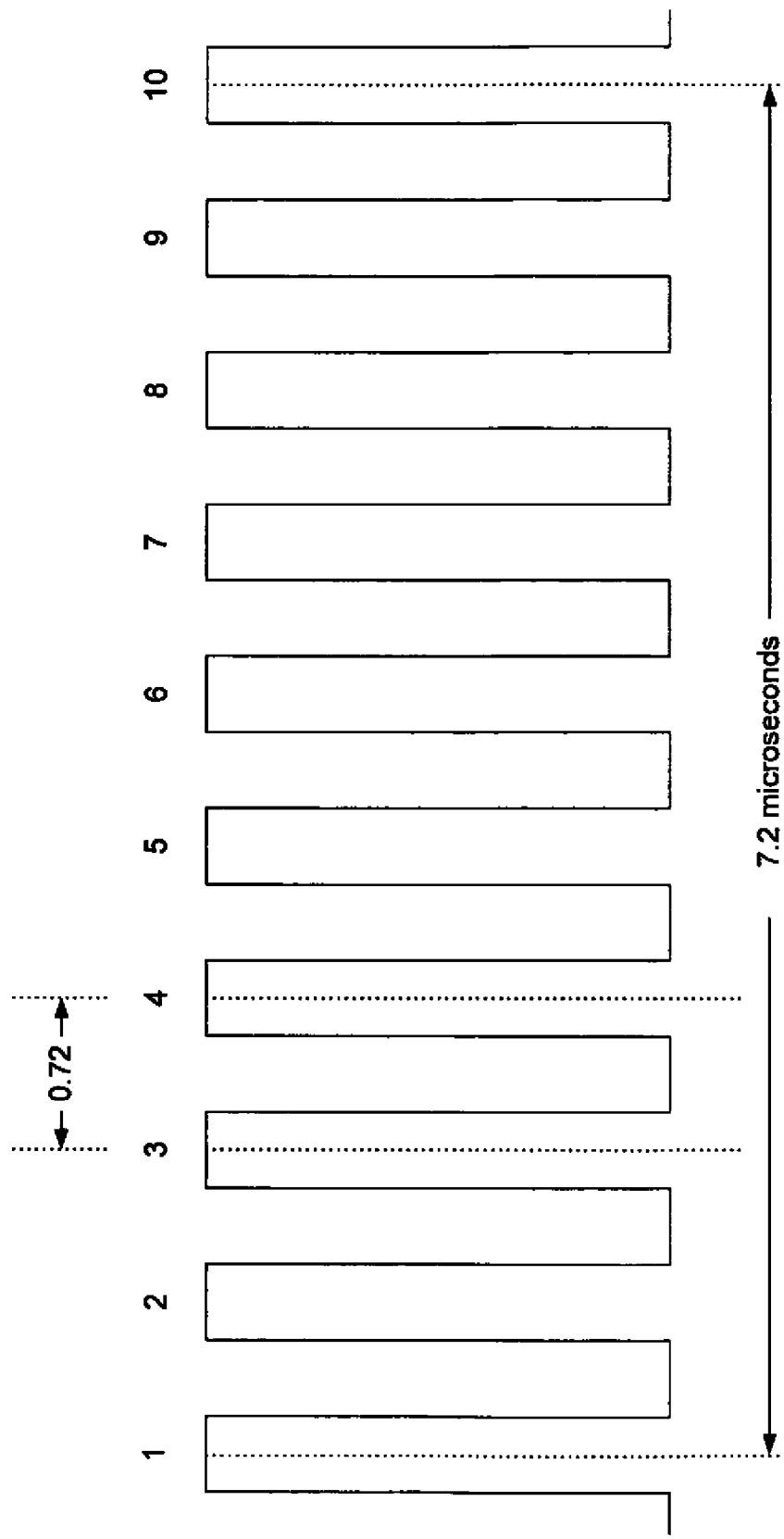
FIG. 2 is an illustrative timing diagram representing a jam signal transmitted by the station of FIG. 1 pursuant to a CSMA/CA protocol prior to transmitting a data packet.

FIG. 2 is an illustrative timing diagram representing a signal of interest in accordance with one embodiment of the invention. This particular signal of interest serves as a jam signal that is transmitted pursuant to a CSMA/CA protocol prior to transmitting packet data. In one embodiment, the jam signal complies with the 802.11g standard and comprises a periodic sequence of pulses in the time domain. The jam signal also sometimes is referred to as the 'preamble' in the 802.11g standard. Specifically, the jam signal comprises an 7.2 microsecond signal that comprises a sequence of ten periodic pulses with peaks separated by 0.72 microseconds. A station transmits the jam signal onto the 2.4 GHz band specified by the standard in order to inform other stations on the network that they should back off and delay their own transmissions until transmission by the station transmitting the jam signal has completed.

The jam signal ordinarily is detected through an autocorrelation technique in which a time-delayed version of the received signal is compared with the received signal itself. The delay used by the autocorrelator typically matches the delay between periodic pulses of the jam signal. Thus, receipt of the jam signal results in a high autocorrelation value. Unfortunately, the presence of a strong inband sinusoidal interference signal also can result in a high autocorrelation value, resulting in false detection of a jam signal. While accurate detection of a jam signal by stations limits data collisions that otherwise might occur due to simultaneous data transmissions by different stations, false detections of a jam signal can unnecessarily reduce network data throughput by causing stations to unnecessarily back off when there is no need to do so.

Although the jam signal of FIG. 2 is periodic, it is not a sinusoid. Rather, in this example, it is a periodic square wave. A sinusoidal signal generally can result in a high autocorrelation value for almost any delay between its periodic pulses. The use of a periodic non-sinusoidal signal as the signal of interest (i.e. the jam signal) is more likely to provide a much higher autocorrelation result from an autocorrelator that is tuned to more closely match its periodicity than it is from autocorrelators that are not closely matched to its periodicity.

Figure 3:
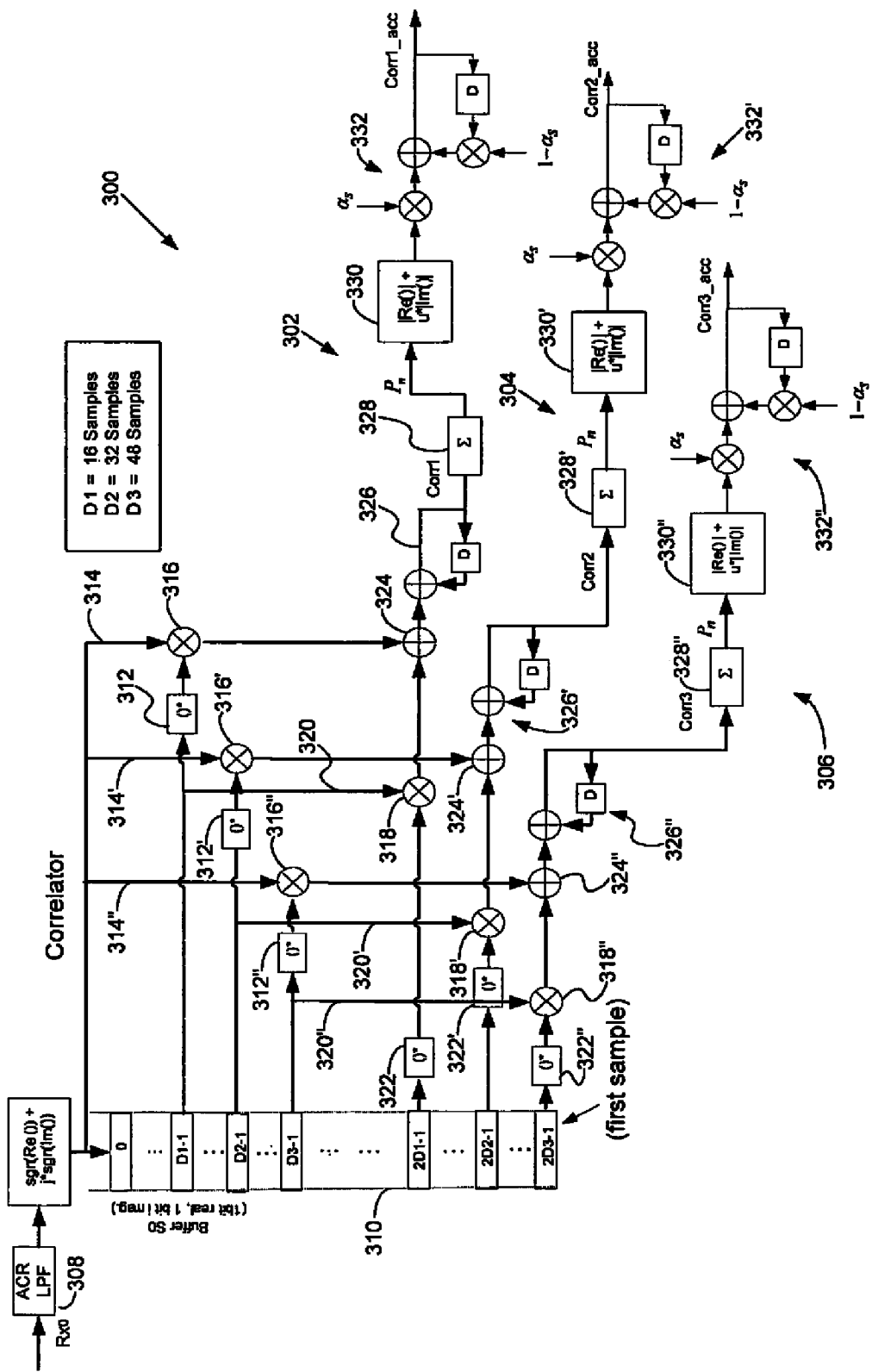
FIG. 3 is an illustrative schematic diagram of processing circuitry operable to produce autocorrelation values for the station of FIG. 1 in accordance with an embodiment of the invention.

FIG. 3 is an illustrative schematic diagram of signal processing circuitry 300 embodied in the BPMAC 110 in accordance with one embodiment of the invention. The processing circuitry 300 implements three autocorrelators, 302, 304, 306. In one embodiment, a first autocorrelator (corr_1) 302 autocorrelates a received signal with a version of the signal delayed by 0.4 microseconds. A second autocorrelator (corr_2) 304 autocorrelates a received signal with a version of the signal delayed by 0.8 microseconds. A third autocorrelator (corr_3) 306 autocorrelates a received signal with a version of the signal delayed by 1.2 microseconds. One embodiment uses a 40 MHz clock, and therefore, corr_1 302 captures 16 samples; corr_2 304 captures 32 samples; and corr_3 306 captures 48 samples.

The delay associated with the second autocorrelator 304 is configured to produce a maximum autocorrelation value upon receipt of the prescribed signal of interest (jam signal) described above. The delays of the first and third autocorrelators 302 and 306 are configured to produce increased autocorrelation values upon receipt of any sinusoidal interference signal. As explained more fully below, the station 100 advantageously uses the combination of autocorrelation values produced by the three autocorrelators 302, 304 and 306 to distinguish between interference signals and a jam signal.

More specifically, all three autocorrelators typically will produce higher autocorrelation values for a sinusoidal interferer, but the second autocorrelator 304, which is tuned to the periodicity of the signal of interest produces a significantly higher autocorrelation value than do the first and third autocorrelators 302 and 306 in response to the signal of interest. The difference in autocorrelation values in response to sinusoidal interferers and in response to a signal of interest is used to advantage in the disclosed embodiment to differentiate between sinusoidal interferer signals and a signal of interest.

It will be appreciated that the principles of the invention can be achieved with the use of only two autocorrelators: one tuned to the delay of the signal of interest; and the other tuned to a different delay. More specifically, since as mentioned above, virtually any sinusoidal signal, regardless of its periodicity results in a high value of autocorrelation, only one additional autocorrelator tuned to a delay different from that of the signal of interest is required to detect a sinusoidal interferer with a delay different from that of the signal of interest. However, two additional autocorrelators tuned to two different delays, each different from that of the signal of interest, are employed in the disclosed embodiment in order to enhance confidence in the result.

Referring to FIG. 3, the first second and third autocorrelators 302, 304 and 306 are identical except for their delays. For that reason, only one of the three autocorrelators is described in detail. Corresponding components of the three autocorrelators are described with identical reference numerals. Components of the first autocorrelator 302 are labeled with unprimed reference numerals. Components of the second autocorrelator 304 are labeled with single primed reference numerals. Components of the third autocorrelator 306 are labeled with double primed reference numerals.

Block 308 represents adjacent channel reject (ACR) circuitry and low pass filtering (LPF) circuitry. Pursuant to the 802.11g standard, individual communication channels are 20 MHz wide. The ACR circuitry passes signals in the 20 MHz channel used by the station. Block 310 represents a sample storage buffer. In one embodiment, the sample buffer comprises FIFO circuitry, which includes D flip-flops. Real and Imaginary sample values are loaded into the FIFO circuitry during each clock cycle.

As mentioned above, the delay of the first autocorrelator 302 is 0.4 microseconds, and the number of samples taken using a 40 MHz clock is D1=16 samples. The delay of the second autocorrelator 304 is 0.8 microseconds, and the number of samples taken using that clock is D2=32 samples. The delay of the third autocorrelator 302 is 1.2 microseconds, and the number of samples taken using the same clock is D3=48 samples.

During each clock cycle, multiplier circuitry 316 multiplies the current (time=0) sample value 314 by the complex conjugate value 316 of one of the D1−1 delayed samples, producing the contribution of the current sample to the autocorrelation value 326. During each clock cycle, multiplier circuitry 318 multiplies each of the D1−1 delayed samples 320 by the complex conjugate value 322 of a corresponding 2D1−1 delayed sample, producing the autocorrelation contribution of the (D−1)th delayed sample that needs to be subtracted Subtraction circuitry 324 subtracts the products produced by multiplier 318 from the product produced by multiplier 316.

Accumulator circuitry 326 sums the values produced by the subtraction circuitry 326 to produce a corr_1 value. In one embodiment, summation circuitry 328 sums the individual corr_1 values accumulated based on reception by multiple antennas (not shown). The 802.11n standard specifies MIMO (multiple input multiple output), which involves the use of multiple antennas to receive a signal. If there is an only a single antenna, then no summation is required. A complex number output value $P_n$ provided by the summation circuitry 328, or of the accumulator circuitry 326 alone if there is no summation circuitry, is provided to magnitude computation circuitry, which weighs the real and imaginary parts appropriately to produce the magnitude of the complex valued autocorrelation.

In one embodiment, the magnitude of $P_n$ is computed as, $$mag(Pn)=|Re|+Mu|m|, \text{ where Mu is a scalar constant value.}$$

A smoothing filter 332 having a single pole $\alpha_s$ smooths the accumulation result. The output is a value corr1_acc, which in the illustrated embodiment, has a maximum value for a signal having a period of 0.4 microseconds.

In one embodiment, a process of distinguishing a signal of interest from a jam signal is implemented using circuitry in the BPMAC 110 that uses the states of the first (corr_1), second (corr_2) and third (corr_3) autocorrelators 302, 304 and 306 to control enabling and disabling of data transmission by the station 100. The autocorrelator state-based transmission control can be summarized as follows.

corr_1=0&&corr_3=0&&corr_2=1&&symb_err=0→disable transmit
corr_1=1||corr_3=1||corr_2=0)||symb_err=1→enable transmit.

Basically, the relative states of the autocorrelators 302, 304 and 306 are used to determine whether a received signal is a jam signal or an interferer signal. If a jam signal is received, then data transmission is postponed. If a sinusoidal signal is received, but no jam signal is received, then data transmission is not postponed and may proceed immediately. Each autocorrelator has its own prescribed threshold value. A given autocorrelator has logical 1 (one) state if it produces an autocorrelation value that meets its prescribed threshold for that autocorrelator. That given autocorrelator has a logical 0 (zero) state if it produces an autocorrelation value that does not meet the prescribed threshold for that autocorrelator. In addition, a check is made for an occurrence of a symbol error. If a symbol error has occurred, then data transmission is not postponed notwithstanding the autocorrelator states.

Figure 4:
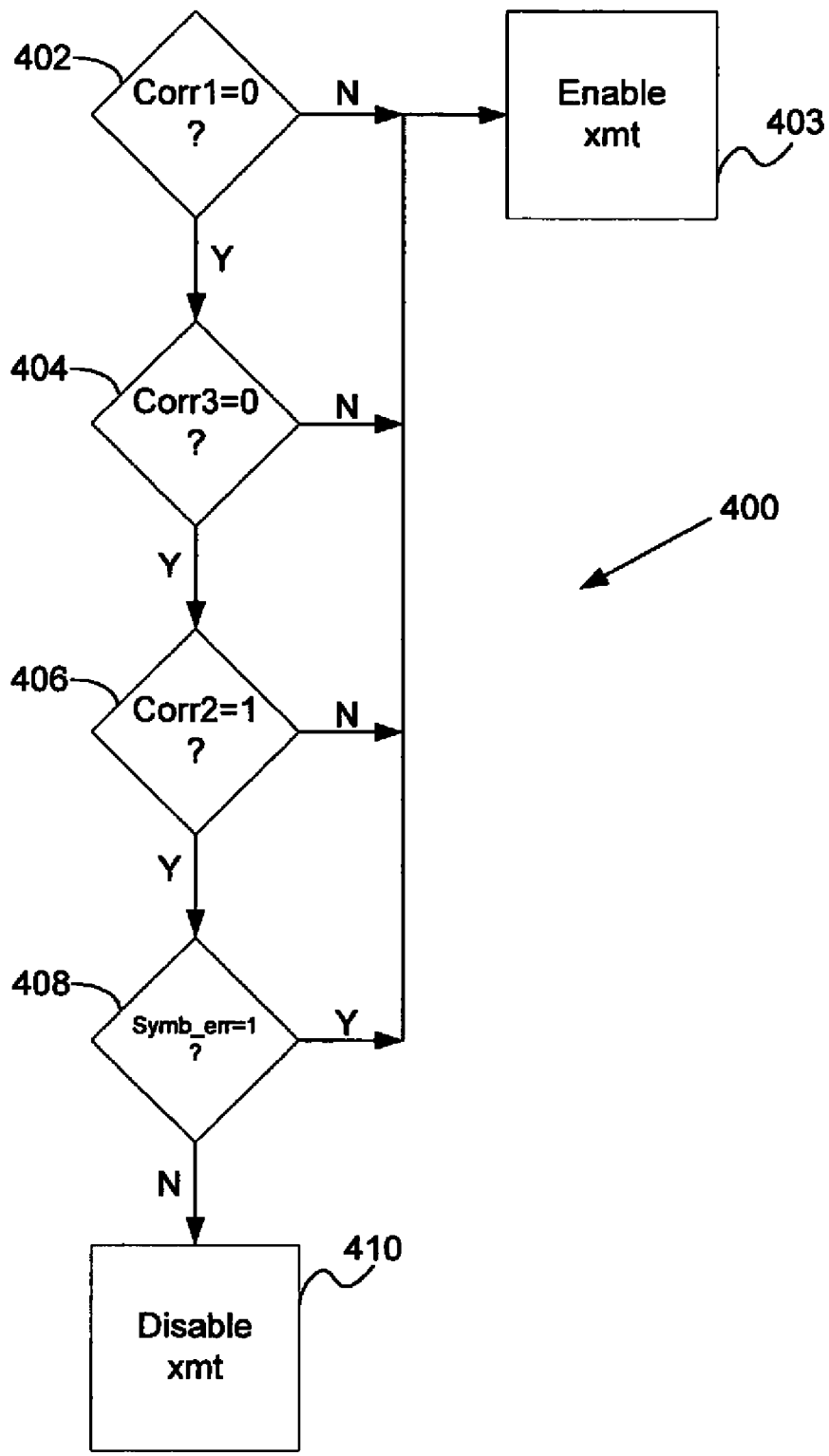
FIG. 4 is an illustrative state transition flow diagram representing a jam signal detection process in accordance with an embodiment of the invention, that uses autocorrelation results from the multiple autocorrelations performed by the processing circuitry of FIG. 3 to discriminate between receipt of a jam signal and receipt of one or more periodic interference signals in order to determine whether to delay a data transmission by the station of FIG. 1.

FIG. 4 is an illustrative flow diagram representing such a jam signal detection process 400 in accordance with an embodiment of the invention. The process uses autocorrelator results from the multiple autocorrelators of FIG. 3 to discriminate between receipt of a jam signal and receipt of one or more sinusoidal interferer signals in order to determine whether to delay a data transmission. In decision step 402, a determination is made as to whether a state of the first autocorrelator (corr_1) 302 indicates that a periodic interferer signal is being received that has a period that closely matches the first autocorrelator delay, i.e. 1.2 microseconds. If in step 402 a state of corr_1 302 indicates no receipt of a periodic interference signal, i.e. corr_1=0, then go to step 404.

In decision step 404, a determination is made as to whether a state of the second autocorrelator (corr_2) 304 indicates that a periodic interferer signal is being received that has a period that closely matches the first autocorrelator delay, i.e. 0.8 microseconds. If in step 404 a state of corr_2 304 indicates receipt of a jam signal, i.e. corr_2=1, then go to step 406.

In decision step 406, a determination is made as to whether a state of the third autocorrelator (corr_3) 306 indicates that a periodic interferer signal is being received that has a period that closely matches the first autocorrelator delay, i.e. 0.4 microseconds. If in step 406 a state of corr_3 306 indicates no receipt of a periodic interferer signal, i.e. corr_3=0, then go to step 408.

In decision step 408, a determination is made as to whether a symbol error has occurred. If in step 408 a determination is made that no symbol error has occurred, i.e. symb_err=0, then data transmission input to RF transmission control circuitry portion 410, which prevents immediate RF transmission.

If in step 402 a state of corr_1 302 indicates receipt of a periodic interference signal, i.e. corr_1=1; and in step 404 a state of corr_2 304 indicates receipt of a jam signal, i.e. corr_2=1; and in step 406 a state of corr_3 306 indicates receipt of a periodic interference signal, i.e. corr_3=1; or in step 408 a determination is made that symbol error has occurred, i.e. symb_err1, then data transmission is permitted by RF transmission control circuitry portion 403.

In one embodiment, the state transition process illustrated in FIG. 4 is implemented in the BPMAC 110 as hardware logic circuits and/or firmware, which may include a combination of programmable logic and embedded code. RF transmission control circuitry portion, which enables RF transmission, is implemented in MAC logic circuitry and/or firmware that proceeds with a data transmission if the conditions tested in decision steps 402, 404, 406 and 408 all indicate that the received signal is a jam signal. RF transmission control circuitry portion 410, which temporarily delays RF transmission, is implemented in MAC logic circuitry and/or firmware that delays transmission by a substantially random time interval if one or more of the conditions tested in decision steps 402, 404, 406 and 408 indicate that the received signal is not a jam signal.

Figure 5:
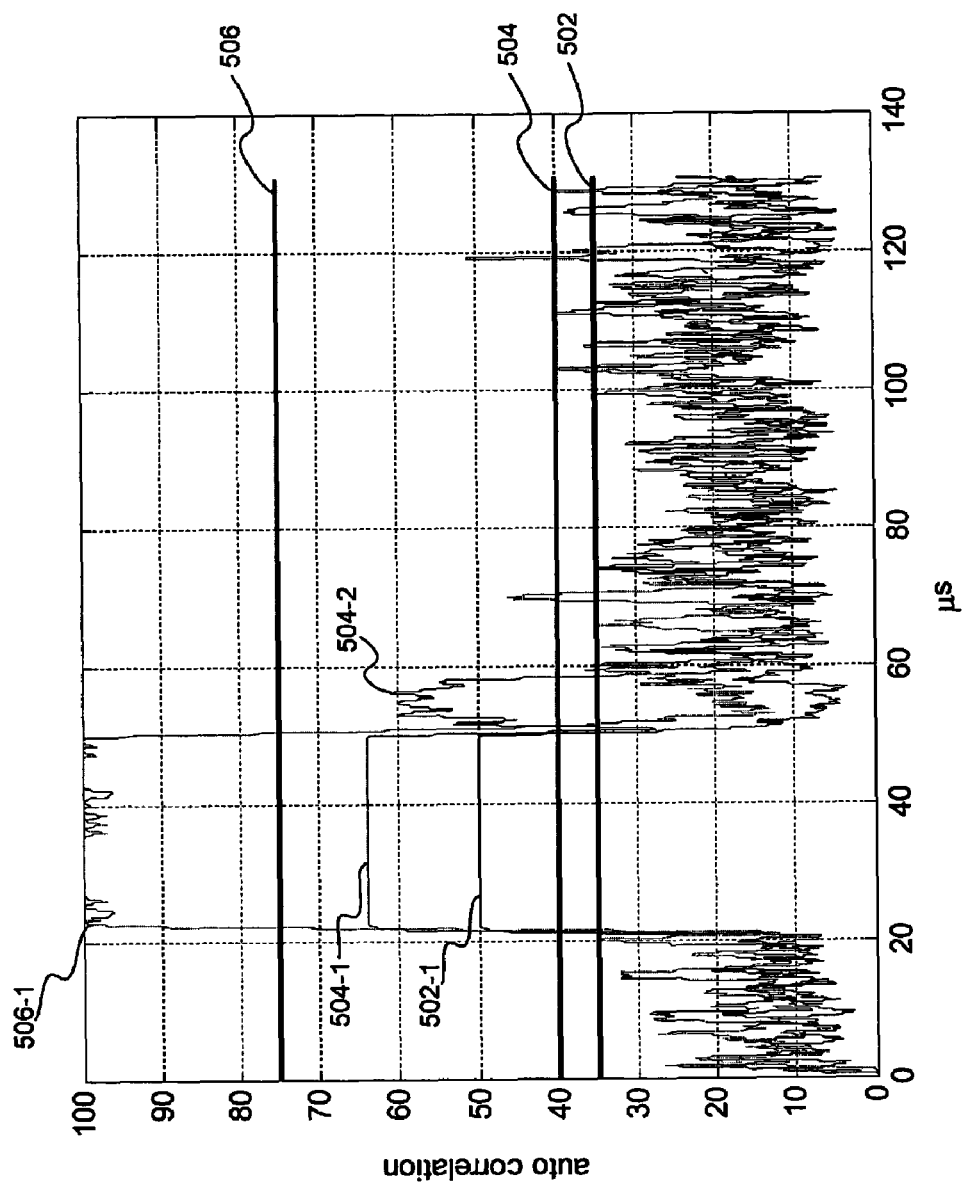
FIG. 5 is an illustrative graph representing simulation results for a wireless station that employs circuitry of FIG. 3 to discriminate between a jam signal and one or more sinusoidal interferer signals in accordance with an embodiment of the invention.

FIG. 5 is an illustrative graph representing simulation results for the station 100, which employs circuitry of FIG. 3 to discriminate between a jam signal and one or more sinusoidal interferer signals. The bottom-most horizontal line 502 represents a threshold of about 35 for the value for corr1_acc produced by the first autocorrelator 302. The middle horizontal line 504 represents a threshold of about 40 for the value for corr2_acc produced by the second autocorrelator 304. The top-most horizontal line 506 represents a threshold of about 75 for the value for corr3_acc produced by the third autocorrelator 306. For each autocorrelator, its threshold value represents a minimum autocorrelation value indicative of the presence of a signal having a period matching the autocorrelator's delay. More particularly, each threshold value corresponds to a count. The individual thresholds (e.g. 35, 40, 75) are arrived at by comparing the statistics (distribution) of the autocorrelation values produced by a particular autocorrelator, corresponding to the "interferer" portion and the "interferer+desired signal" portion of the received signal. See FIGS. 8A-8B, discussed below. The instant values of autocorrelation are compared with these thresholds.

In one embodiment, the first, second and third autocorrelators 302, 304 and 306 produce running, i.e. continually updated, autocorrelation values. The state of each autocorrelator is determined by whether its value meets a threshold value prescribed for that autocorrelator for a duration of time prescribed for that autocorrelator. Each autocorrelator has a corresponding prescribed threshold value and a corresponding time duration for which it must meet the threshold value in order to transition to a state indicative of the presence of the signal that it is configured to identify.

In this illustrative example, the station 100, receiving WLAN signal begins to listen on a 20 MHz communication channel at time t=0. Between t=0 and t=20 microseconds, only noise is present on the channel. At t=20 microseconds, a sinusoidal interferer (SSI), weaker in power than the desired signal, is added to the channel. During the time interval from t=20 microseconds to approximately t=50 microseconds, only noise and the SSI are present on the channel. Beginning at about t=50 microseconds, a jam signal is added to the channel. The duration of the jam signal is 10 microseconds. Between t=50 microseconds and t=60 microseconds, noise, SSI and jam signal (preamble) are present on the channel. At approximately t=60 microseconds, the SSI and the jam signal cease, leaving noise and rest of the WLAN signal on the channel thereafter.

During the time interval, t=20 microseconds to t=50 microseconds, when only noise and an SSI are present, the autocorrelator values or all three autocorrelators 302, 304 and 306 plateau above their respective thresholds. The value produced by the first autocorrelator 302 indicated at 502-1 is approximately equal to 50. The value produced by the second autocorrelator 304 indicated at 504-1 is approximately equal to 64. The value produced by the third autocorrelator 306 indicated at 506-1 is approximately equal to 100. The individual values attained by each of the autocorrelators depend on the delay of the samples.

During the time interval t=50 microseconds to t=60 microseconds, when noise, SSI and jam signal are present, only the value produced by the second autocorrelator 304, indicated at 504-2, surpasses its threshold 504. The autocorrelation values produced by the first and third autocorrelators 302 and 306 are beneath their respective thresholds 502 and 506. The jam signal referred to here is a periodic signal, but NOT a sinusoid and is stronger in power than the SSI. A sinusoid will generally give rise to a high value of autocorrelation for almost any delay. However, the jam signal peaks ONLY for the autocorrelator with delay that matches its periodicity, and hence during T=50 to T=60, only the second autocorrelator's output value is high, since SSI is weaker in power than the jam signal.

During the time interval after t=60 microseconds, when only noise is present, all three autocorrelator values drop below their thresholds.

Figure 6:
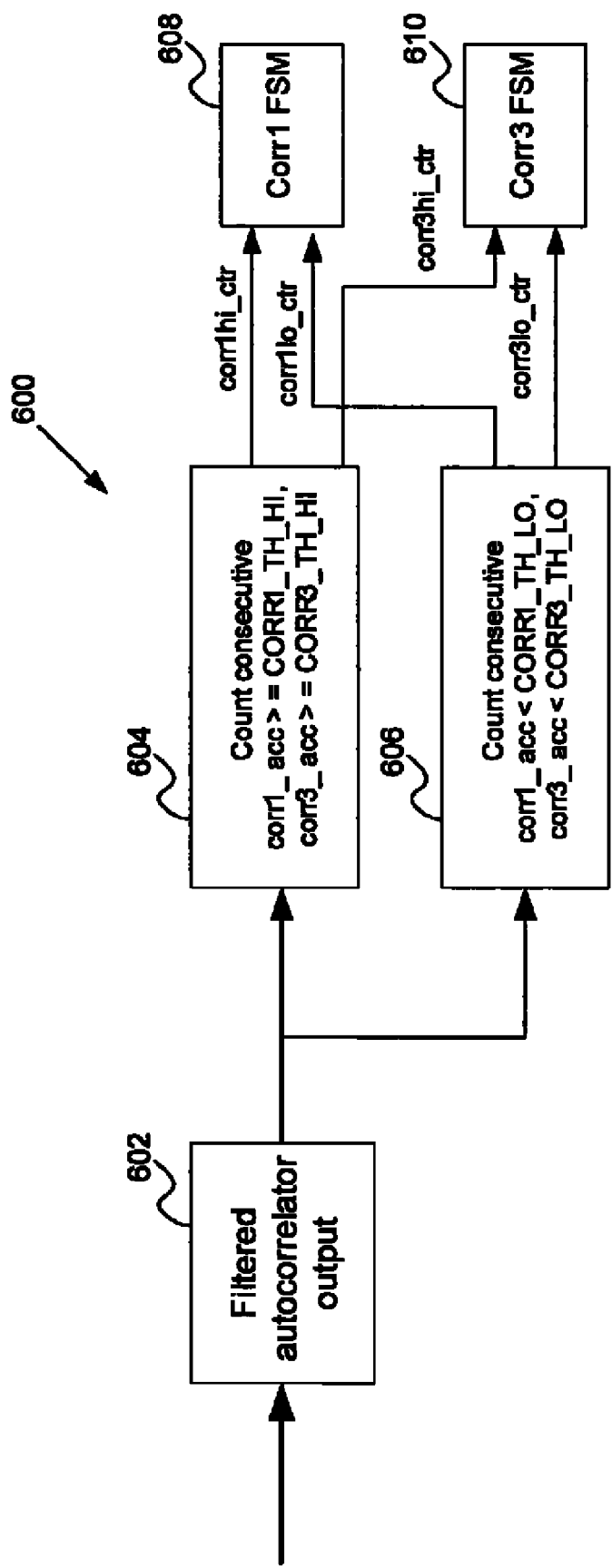
FIG. 6 is an illustrative block diagram representing monitor circuitry operable to implement an autocorrelation metric that prescribes the length of time during which autocorrelators implemented by the processing circuitry of FIG. 3 should maintain a prescribed value in order to prompt a state transition in accordance with an embodiment of the invention.

FIG. 6 is an illustrative block diagram representing monitor circuitry 600 in the BPMAC section 110 operable to implements an autocorrelation metric that prescribes the length of time during which the first and third autocorrelators of FIG. 3 should maintain a prescribed value in order to prompt a state transition in accordance with an embodiment of the invention. Block 602 represents receipt of respective corr1_acc and corr3_acc values produced by the first and third autocorrelators 302 and 306, respectively. Hi threshold counter block 604 represents circuitry that counts the number of consecutive clock cycles during which the autocorrelation value corr1_acc exceeds a threshold value of CORR1_TH_HI. The CORR1_TH_HI threshold value is the same as threshold 502. Every time this CORR1_TH_HI condition is met, the counter value is incremented.) Hi threshold counter block 604 also represents circuitry that counts the number of consecutive clock cycles during which the autocorrelation value corr3_acc exceeds a threshold value of CORR3_TH_HI. The CORR3_TH_HI threshold counter value is the same as threshold 506. Every time the CORR3_TH_HI condition is met, the counter value is incremented.

Lo counter threshold block 606 represents circuitry that counts the number of consecutive clock cycles during which autocorrelation value corr1_acc is less than a threshold value of CORR1_TH_LO. Lo counter threshold block 606 also represents circuitry that counts the number of consecutive clock cycles during which autocorrelation value corr3_acc is less than a threshold value of CORR3_TH_LO. Usually the LO threshold is set the same as the HI threshold. The LO threshold capability adds flexibility in the hardware to provide hysteresis, by providing a separate register for the LO threshold. There are times when it might be desirable to make the FSM come back to state 0 from state 1, with not as much ease as it went from state 0 to state 1. The additional register for LO threshold can help achieve that result.

A corr1 FSM (finite state machine) 608 receives a corr1hi_ctr value and a corr1lo_ctr value from the respective hi counter threshold block 604 and lo counter threshold block 606. Similarly, a corr3 FSM 610 receives a corr3hi_ctr value and a corr3lo_ctr value from the respective hi counter threshold block 604 and lo counter threshold block 606.

Figure 7:
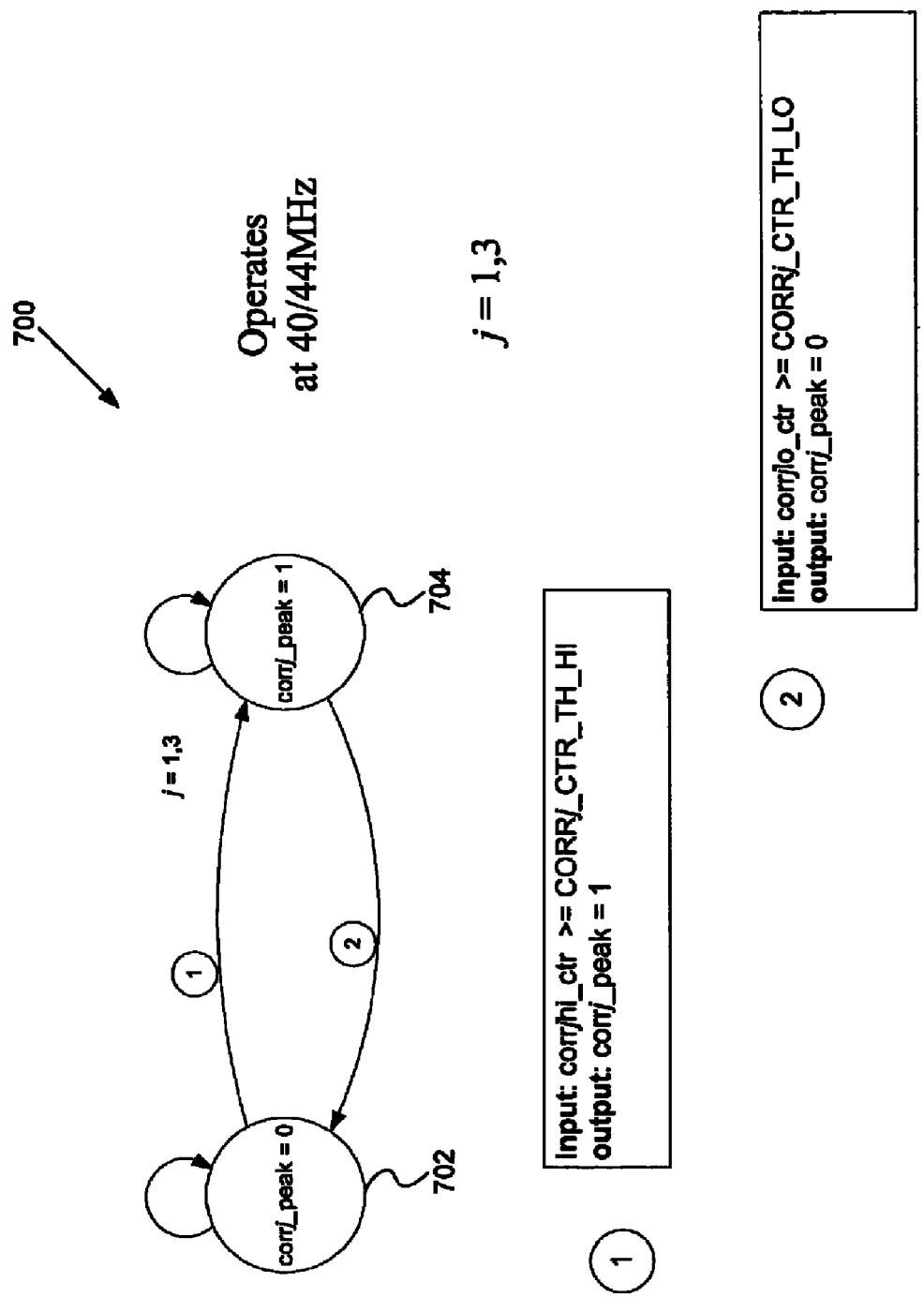
FIG. 7 is an illustrative state diagram representing state transitions of the circuitry of FIG. 6 in response to the duration of time during which autocorrelators exceed their respective high thresholds or fall below their respective low thresholds.

FIG. 7 is an illustrative state diagram 700 representing state transitions of FSMs 608 and 610 of the monitor circuitry 600 in response to the duration of time during which autocorrelation values produced by the first and/or third autocorrelators 302 and 306 exceed their respective high thresholds or fall below their respective low thresholds. The FSM 608 transitions to state 704 in which corr1_peak=1 if corr1hi_ctr>=CORR1_CTR_TH_HI. The FSM 608 transitions to state 702 in which corr1_peak=0 if corr1lo_ctr>=CORR1_CTR_TH_LO. The FSM 610 transitions to state 704 in which corr3_peak=1 if corr3hi_ctr>=CORR3_CTR_TH_HI. The FSM 610 transitions to state 702 in which corr3_peak=0 if corr3lo_ctr>=CORR3_CTR_TH_LO.

Figure 8A:
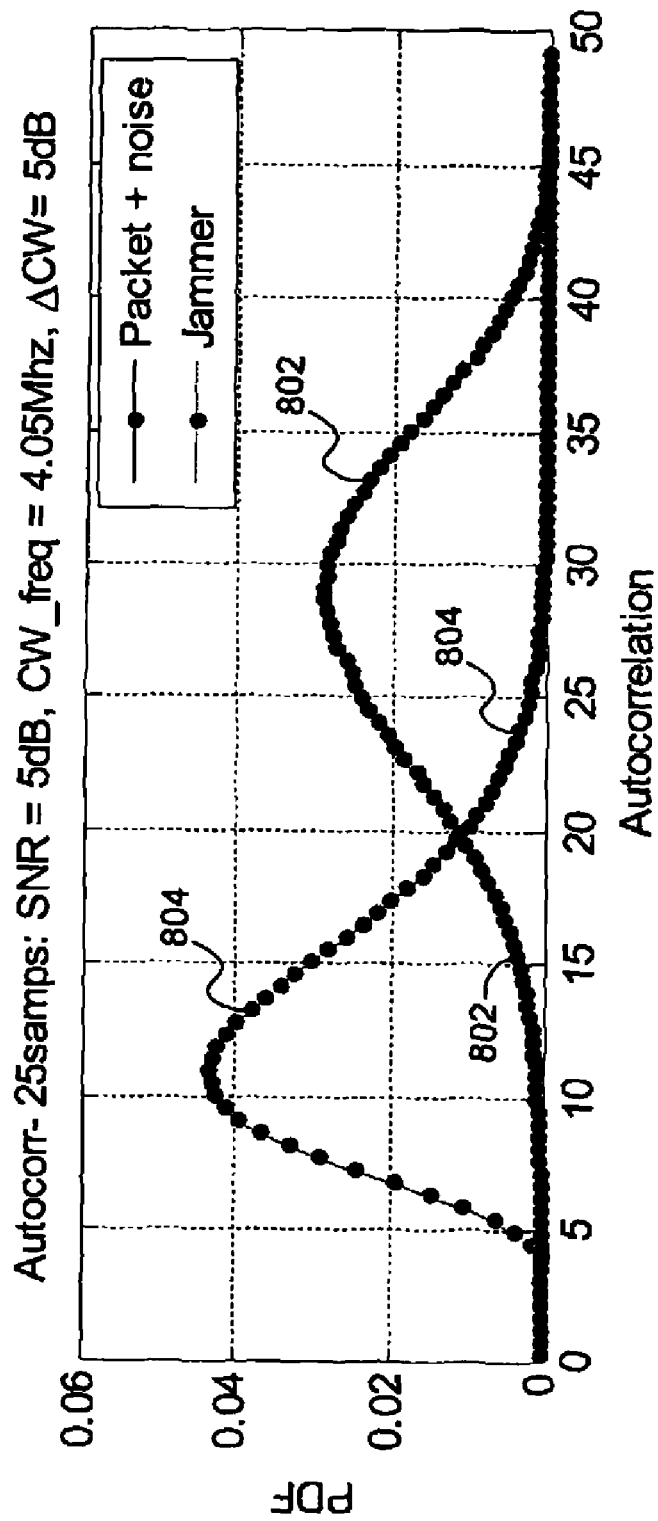
FIGS. 8A-8B are illustrative graphs showing an example of a determination of threshold levels referred to FIGS. 6-7.
Figure 8B:
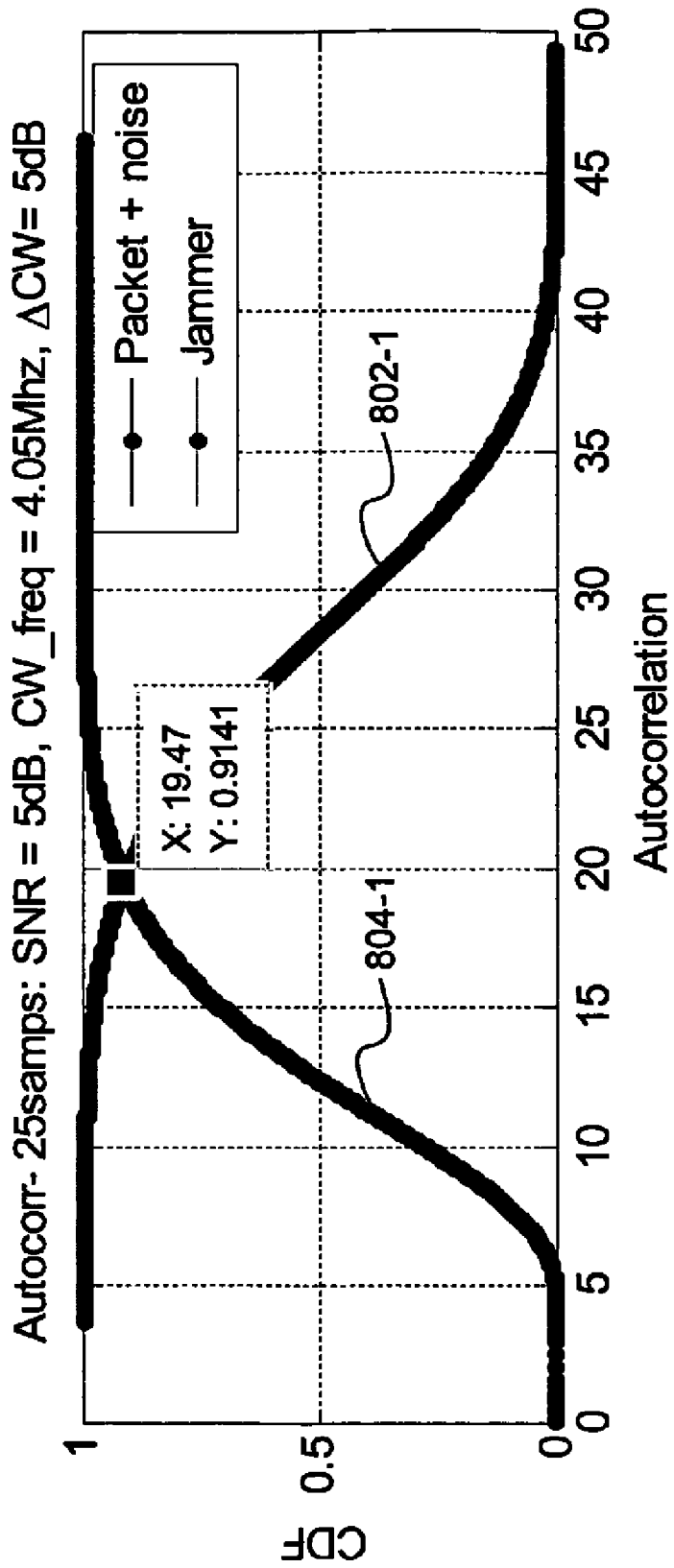

It will be understood that the state transitions computed as explained with reference to FIGS. 6-7 result in the states referenced in decisions steps 402 and 404 in FIG. 4. Thus, for example, the first and third autocorrelators 302 and 306 have to maintain a value above a prescribed threshold for at least a prescribed amount of time in order to prompt a state change to corrj_peak=1 (j=1,3) in its respective FSM 608 or 610. Conversely, once a FSM 608 or 610 has transitioned to the corrj_peak=1 state, it has to fall below a prescribed threshold for at least a prescribed amount of time in order to prompt a state change back to corrj_peak=0. The time interval requirements guards against state transitions occurring in response to environmental noise, for example. Thus, the FSMs 608 and 610 are designed robustly enough to ascertain whether autocorrelation values continue to substantially meet their respective thresholds for at least substantially their respective counts despite minor fluctuations due to environmental factors unrelated to whether a detected signal is a signal of interest or an interferer, for example:

FIGS. 8A-8B are illustrative graphs showing an example of how hi threshold levels described with reference to FIGS. 6-7 can be produced. Results such as those shown by way of example in FIGS. 8A-8B are arrived at empirically. FIG. 8A represents a measure of probability density function (PDF) versus autocorrelation value for one of the autocorrelators attuned to identify an SSI. The curve labeled 802 shows results in presence of a sinusoidal interferer only. The curve labeled 804 shows results in presence of a noise and a jam signal only. The curve 802 shows that autocorrelator value has a highest probability of a value of about 29 in the presence of only an interferer. The curve 804 shows that autocorrelator value has a highest probability of a value of about 11 in the presence of only a packet and noise. The separation of the two curves is significant because it is the reason that the autocorrelator values for the first and third autocorrelators 302 and 306 drop off during the 50-60 microsecond time interval shown in FIG. 5. Basically, the first and the third autocorrelator do not give rise to a high value of autocorrelation in the presence of a jam signal.

FIG. 8B shows a measure of cumulative density function (CDF) versus autocorrelation value for one of the autocorrelators. The curve 802-1 represents inverse cumulative distribution function (1-area) of the autocorrelation value produced by samples corresponding to the "interferer" portion of the packet and curve 804-1 represents cumulative distribution function of the autocorrelation value produced by samples corresponding to the "nosie+desired signal" portion of the packet. The value at the crossing point of curves 802-1 and 804-1 is selected as the threshold value for the autocorrelator represented by these curves. In this example, that value is 19.47.

In very noisy environments, the values cor1_acc and corr3_acc can fluctuate significantly in the presence of a SSI signal. A problem that can result is that the fluctuation may prevent a state transition of FSM 608 and/or FSM 610 to state 704 shown in FIG. 7, because the fluctuations may preclude the autocorrelation values from staying above the hi threshold long enough to trigger such a state transition. As a result, it is possible that only the second autocorrelator will have a value that exceeds its threshold, and as a result, a false detection of a jam signal could be declared, causing unnecessary transmission delay.

In order to mitigate the problem of noise causing the first or third autocorrelators to be unable to exceed their hi thresholds despite the presence of an SSI signal, the BPMAC 110 includes circuitry that monitors the values of corr1_acc and corr3_acc after corr2_acc after the state transition process of FIG. 4 results in a transition to temporarily disable RF transmission. If both corr1_acc and corr3_acc exceed their respective thresholds before the passage of the right index of the supposed jam signal, i.e. 7.2 microseconds elapsed, then a symbol error (symb_err=1) is declared, and the state transition process of FIG. 4 results in permitting RF transmission.

Figure 9:
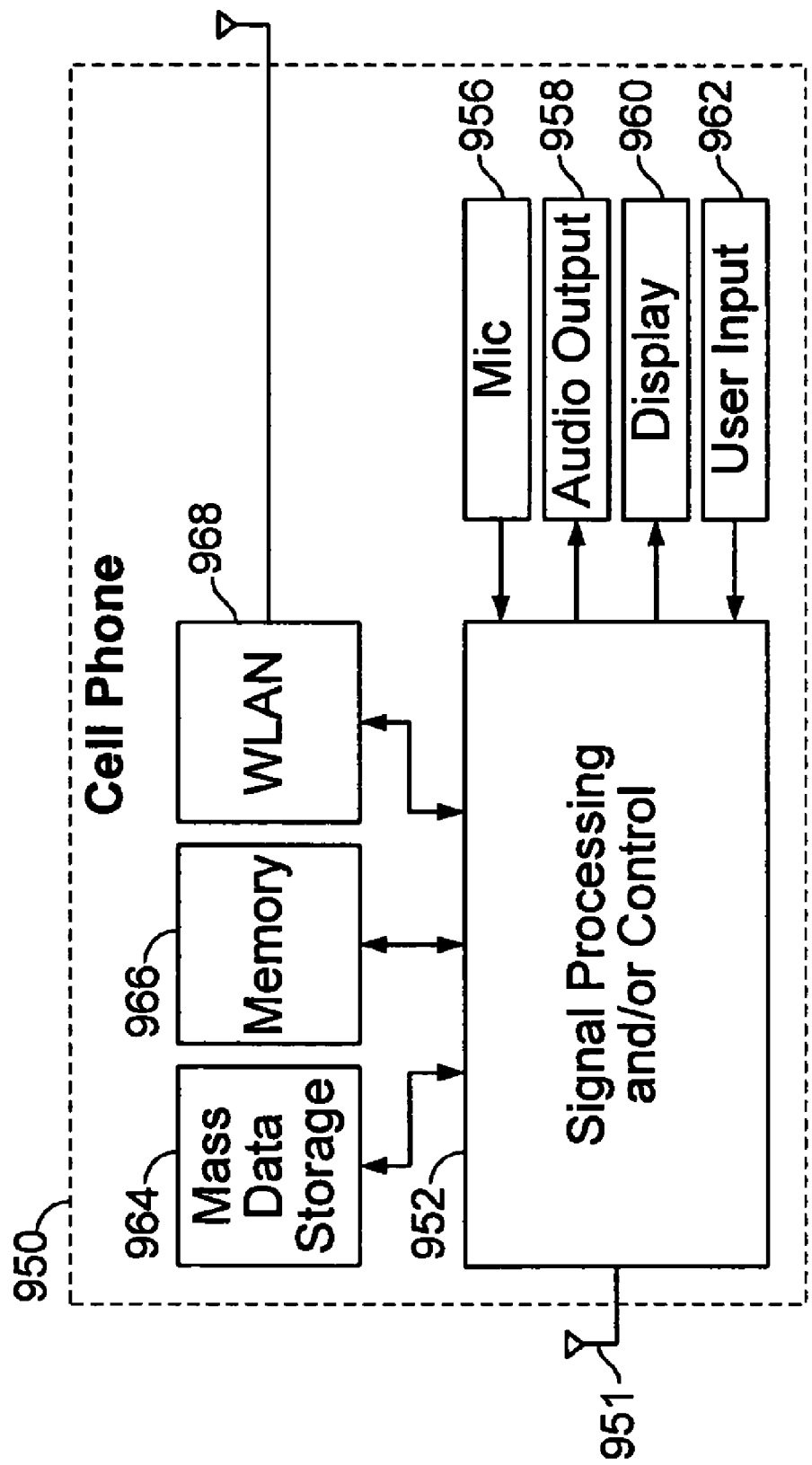
FIG. 9 is an illustrative block diagram of a cellular phone system that includes circuitry for detection of strong high frequency interference in wireless communications in accordance with an embodiment of the invention.

FIG. 9 is an illustrative block diagram of a cellular phone system 950 that includes circuitry for detection of strong high frequency interference in wireless communications in accordance with an embodiment of the invention. The cellular phone 950 includes a cellular antenna 951. Signal processing and/or control circuits 952 communicate with a WLAN 968 interface and/or memory 966 or mass data storage 964 of the cellular phone 950. In some implementations, the cellular phone 950 includes a microphone 956, an audio output 958 such as a speaker and/or audio output jack, a display 960 and/or an input device 962 such as a keypad, pointing device, voice actuation and/or other input device. WLAN interface 968 includes the detection circuitry (not shown). The signal processing and/or control circuits 952 and/or other circuits (not shown) in the cellular phone 950 may process data, perform coding and/or encryption, perform calculations, format data and/or perform other cellular phone functions. The cellular phone 950 may be connected to memory 966 such as RAM, ROM, low latency nonvolatile memory such as flash memory and/or other suitable electronic data storage. The cellular phone 950 also may support connections with a WLAN via the WLAN network interface 968.

Figure 10:
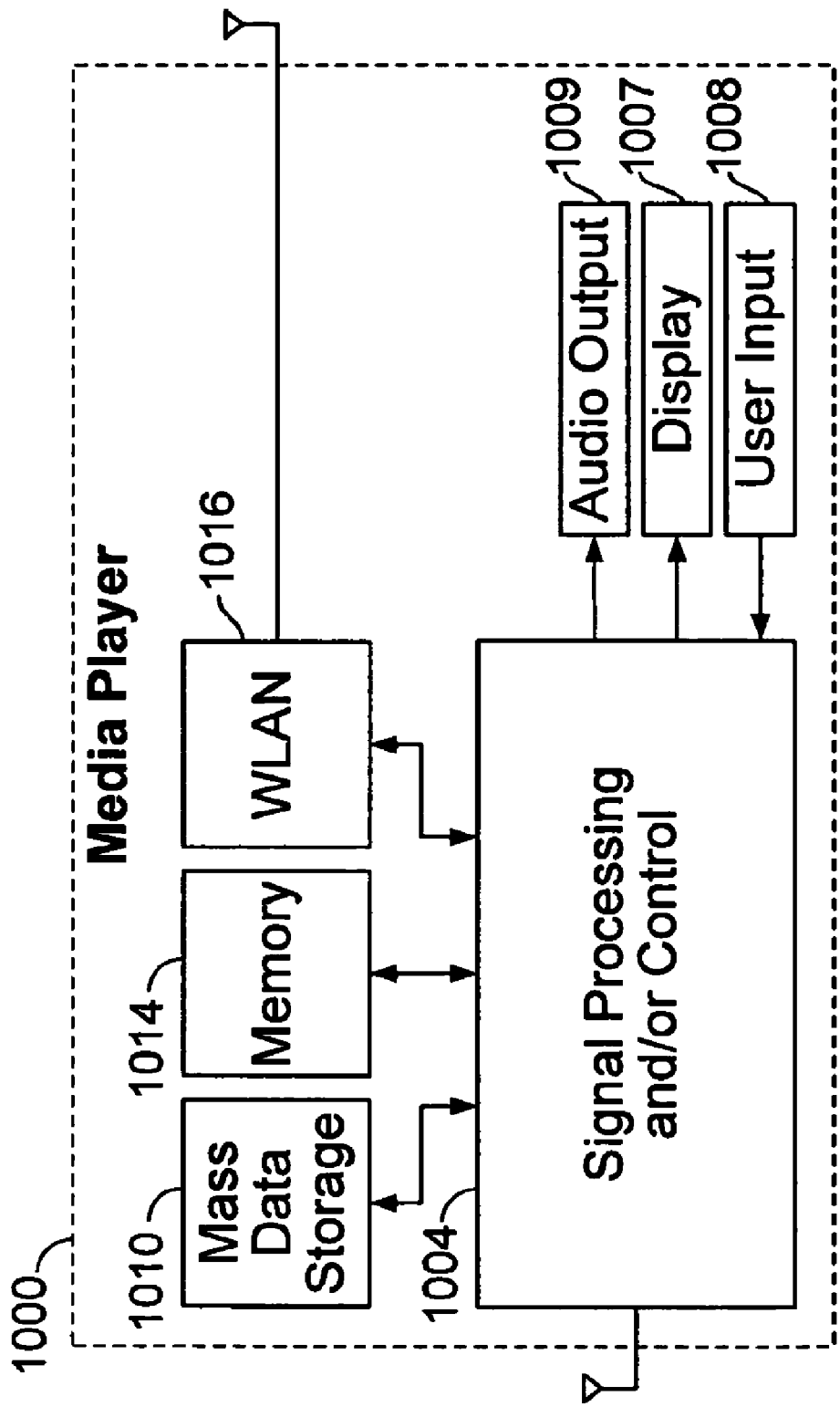
FIG. 10 is an illustrative block diagram of a media player that includes for detection of strong high frequency interference in wireless communications circuitry in accordance with an embodiment of the invention.

FIG. 10 is an illustrative block diagram of a media player 1000 that includes circuitry for detection of strong high frequency interference in wireless communications in accordance with an embodiment of the invention. In one embodiment the media player may comprise an MP3 player, for example. The media player 1000 may communicate with mass data storage 1010 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The media player 1000 may be connected to memory 1014 such as RAM, ROM, low latency nonvolatile memory such as flash memory and/or other suitable electronic data storage. The media player 1000 also may support connections with a WLAN via the WLAN network interface 1016. Still other implementations in addition to those described above are contemplated.

Signal processing and/or control circuits 1004 communicate with a WLAN interface 616 and/or mass data storage 1010 and/or memory 1014 of the media player 1000. The WLAND interface 616 includes the detection circuitry (not shown). In some implementations, the media player 1000 includes a display 1007 and/or a user input 1008 such as a keypad, touchpad and the like. In some implementations, the media player 1000 may employ a graphical user interface (GUI) that typically employs menus, drop down menus, icons and/or a point-and-click interface via the display 1007 and/or user input 1008. The media player 1000 further includes an audio output 1009 such as a speaker and/or audio output jack.

The signal processing and/or control circuits 1004 and/or other circuits (not shown) of the media player 1000 may process data, perform coding and/or encryption, perform calculations, format data and/or perform any other media player function.

Figure 11:
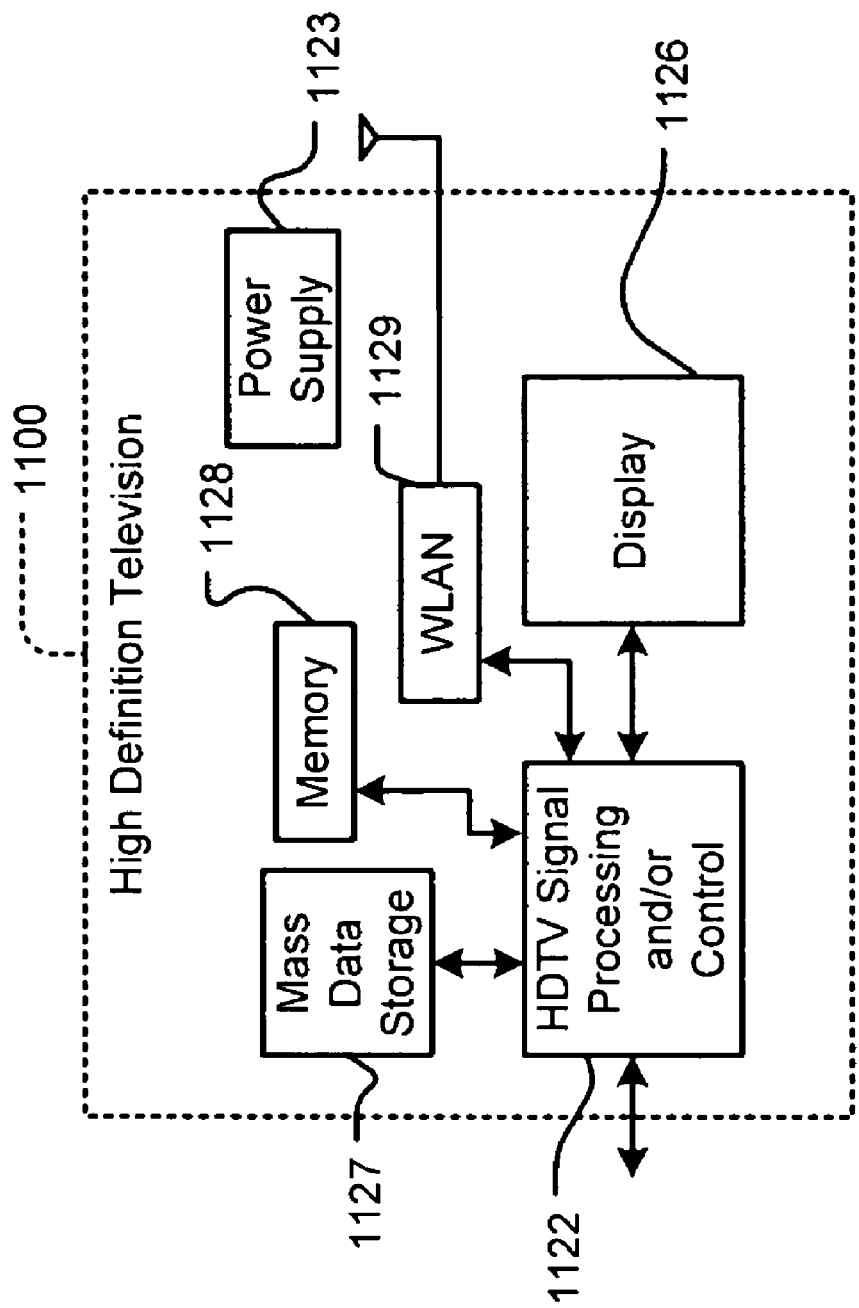
FIG. 11 is an illustrative block diagram of a high definition television (HDTV) that includes for detection of strong high frequency interference in wireless communications circuitry in accordance with an embodiment of the invention.

FIG. 11 is an illustrative block diagram of a high definition television (HDTB) 1100 that includes circuitry for detection of strong high frequency interference in wireless communications in accordance with an embodiment of the invention. Performance monitor circuitry may be implemented in a WLAN interface 1129. The HDTV 1100 receives HDTV input signals in either a wired or wireless format and generates HDTV output signals for a display 1126. In some implementations, signal processing circuit and/or control circuit 1100 and/or other circuits (not shown) of the HDTV 1100 may process data, perform coding and/or encryption, perform calculations, format data and/or perform any other type of HDTV processing that may be required.

The HDTV 1100 may communicate with mass data storage 1127 that stores data in a nonvolatile manner such as optical and/or magnetic storage devices. The HDTV 1100 may include mass storage 1127 such as HDD. The HDTV 1100 also may include memory 1128 such as RAM, ROM, low latency nonvolatile memory such as flash memory and/or other suitable electronic data storage. The HDTV 1100 also supports connections with a WLAN via the WLAN network interface 1129, which includes the detection circuitry.

Figure 12:
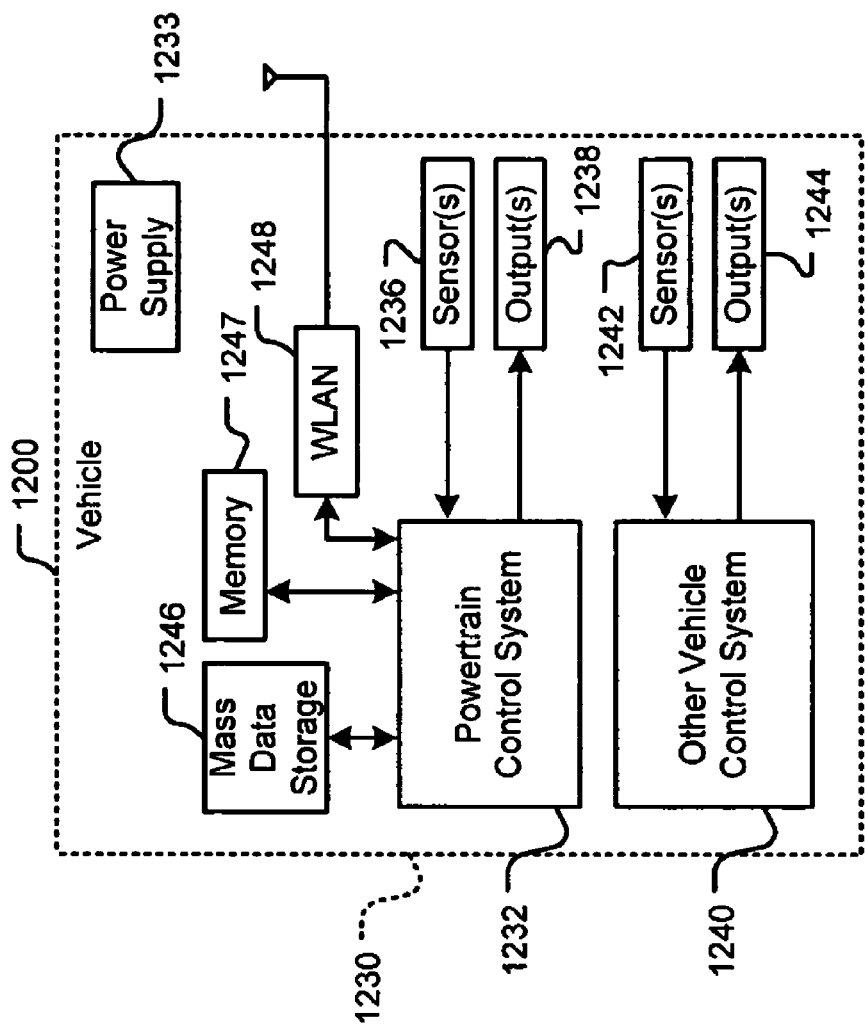
FIG. 12 is an illustrative block diagram of vehicle control systems that includes circuitry for detection of strong high frequency interference in wireless communications in accordance with an embodiment of the invention.

FIG. 12 is an illustrative block diagram of a vehicle 1200 a WLAN interface 848 that includes circuitry for detection of strong high frequency interference in wireless communications in accordance with an embodiment of the invention. In some implementations a powertrain control system 1232 receives inputs from one or more sensors 1236 such as temperature sensors, pressure sensors, rotational sensors, airflow sensors and/or any other suitable sensors and/or that generates one or more output control signals such as engine operating parameters, transmission operating parameters, and/or other control signals.

Other control systems 1240 of the vehicle 1200 may likewise receive signals from input sensors 1242 and/or output control signals to one or more output devices 1244. In some implementations, the control system 1240 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1232 may communicate with mass data storage 1246 that stores data in a nonvolatile manner. The mass data storage 1246 may include optical and/or magnetic storage devices such as, for example, hard disk drives HDD and/or DVDs. The powertrain control system 1232 may be connected to memory 1247 such as RAM, ROM, low latency nonvolatile memory such as flash memory and/or other suitable electronic data storage. The powertrain control system 1232 also may support connections with a WLAN via a WLAN network interface 1248. The control system 1240 may also include mass data storage, memory and/or a WLAN interface (all not shown).

Figure 13:
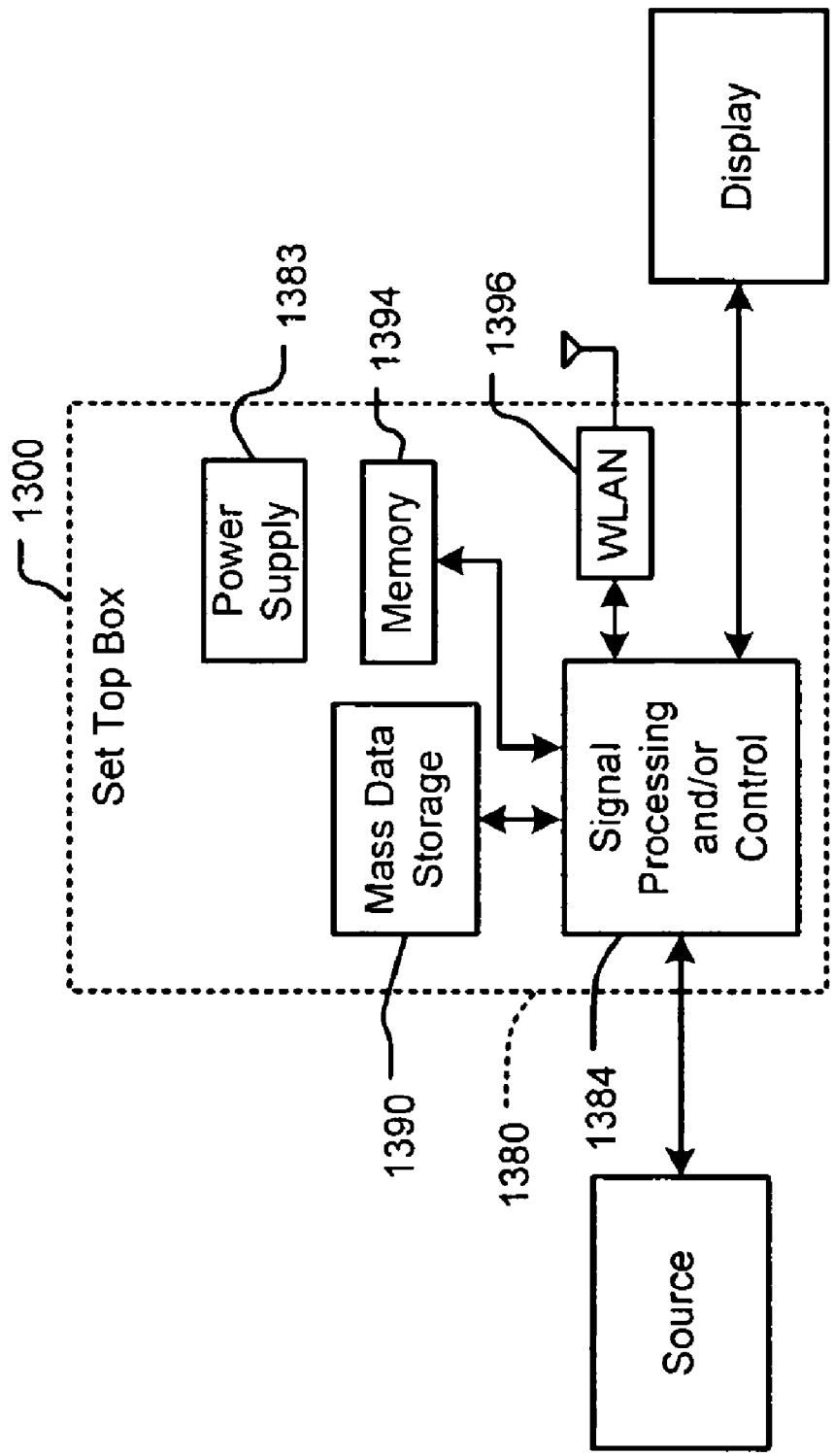
FIG. 13 is an illustrative block diagram of a set top box that includes circuitry for detection of strong high frequency interference in wireless communications in accordance with an embodiment of the invention.

FIG. 13 is an illustrative block diagram of a set top box 1100 that includes WLAN interface 996 with circuitry for detection of strong high frequency interference in wireless communications in accordance with an embodiment of the invention. The set top box 1300 receives signals from a source 1381 such as a broadband source and outputs standard and/or high definition audio/video signals suitable for a display 1388 such as a television and/or monitor and/or other video and/or audio output devices. The signal processing and/or control circuits 1384 and/or other circuits (not shown) of the set top box 1300 may process data, perform coding and/or encryption, perform calculations, format data and/or perform any other set top box function.

The set top box 1300 may communicate with mass data storage 1390 that stores data in a nonvolatile manner. The mass data storage 1390 may include optical and/or magnetic storage devices for example hard disk drives HDD and/or DVDs. The set top box 1300 may be connected to memory 1394 such as RAM, ROM, low latency nonvolatile memory such as flash memory and/or other suitable electronic data storage. The set top box 1300 also may support connections with a WLAN via the WLAN network interface 1396.

While the invention is described herein with reference to various illustrative features, aspects and embodiments, it will be appreciated that the invention is susceptible of variations, modifications and other embodiments, other than those specifically shown and described. For example, in the embodiment described above, two autocorrelators are provided with delays that straddle the delay of the autocorrelator having a delay attuned to the period of the jam signal. However, fewer or greater than a total of three autocorrelators may be employed. The invention is therefore to be broadly interpreted and construed as including all such alternative variations, modifications and other embodiments within its spirit and scope as hereinafter claimed.

The invention claimed is:

1. A method of controlling access to a wireless communications medium, the method comprising:
sampling radio frequency activity on the medium;
autocorrelating samples to produce a first autocorrelation value via a first autocorrelator, wherein the first autocorrelation value is indicative of autocorrelation computed with a first delay matching periodicity of a signal of interest;
monitoring the first autocorrelation value to determine whether the first autocorrelation value is indicative of the signal of interest;
autocorrelating samples to produce a second autocorrelation value via a second autocorrelator, wherein the second autocorrelation value is indicative of autocorrelation computed with a second delay different from the first delay;
monitoring the second autocorrelation value to determine whether the second autocorrelation value is indicative of an interferer signal, wherein the interferer signal is a noise signal;
preventing transmission of a radio frequency transmit signal via radio frequency transmission control circuitry on the medium in response to the first autocorrelation value indicating activity on the medium includes the signal of interest when the second autocorrelation value indicates activity on the medium does not include an interferer signal,
wherein the radio frequency transmission control circuitry comprises at least one of the first autocorrelator and the second autocorrelator:
generating a correlation value via an accumulator circuit of one of the first autocorrelator and the second autocorrelator;
generating a complex value based on the correlation value via a summation circuit of the one of the first autocorrelator and the second autocorrelator;
determining a magnitude of the complex value via a magnitude computation circuit of the one of the first autocorrelator and the second autocorrelator;

and generating one of the first autocorrelation value and the second autocorrelation value based on the magnitude via a filter of the one of the first autocorrelator and the second autocorrelator.

2. The method of claim 1, further including permitting transmission of a radio frequency transmit signal on the medium in response to the first autocorrelation value indicating that activity on the medium does not include the signal of interest.

3. The method of claim 1, further including permitting transmission of a radio frequency transmit signal on the medium in response to the first autocorrelation value indicating activity on the medium includes the signal of interest when the second autocorrelation value indicates activity on the medium includes an interferer signal.

4. The method of claim 1, further including permitting transmission of a radio frequency transmit signal on the medium in response to the first autocorrelation value indicating that activity on the medium either (i) does not include the signal of interest or (ii) includes the signal of interest when the second autocorrelation value indicates that activity on the medium includes an interferer signal.

5. The method of claim 1, further including:
autocorrelating samples to produce a third autocorrelation value indicative of autocorrelation computed with a third delay different from the first delay and different from the second delay;
monitoring the third autocorrelation value to determine whether the third autocorrelation value is indicative of an interferer signal; and
wherein preventing transmission of a radio frequency transmit signal includes preventing transmission of a radio frequency transmit signal on the medium in response to the first autocorrelation value indicating activity on the medium includes the signal of interest when both the second autocorrelation value and the third autocorrelation value indicate activity on the medium does not include an interferer signal.

6. The method of claim 1, further including:
autocorrelating samples to produce a third autocorrelation value indicative of autocorrelation computed with a third delay different from the first delay and different from the second delay; and
monitoring the third autocorrelation value to determine whether the third autocorrelation value is indicative of an interferer signal;
wherein permitting transmission of a radio frequency transmit signal on the medium includes permitting transmission of a radio frequency transmit signal on the medium in response to the first autocorrelation value indicating activity on the medium includes the signal of interest when the second autocorrelation value and the third autocorrelation value both indicate activity on the medium includes an interferer signal; and
wherein preventing transmission of a radio frequency transmit signal includes preventing transmission of a radio frequency transmit signal on the medium in response to the first autocorrelation value indicating activity on the medium includes the signal of interest when both the second autocorrelation value and the third autocorrelation value indicate activity on the medium does not include an interferer signal.

7. The method of claim 1, further including:
autocorrelating samples to produce a third autocorrelation value indicative of autocorrelation computed with a third delay different from the first delay and different from the second delay; and
monitoring the third autocorrelation value to determine whether the third autocorrelation value is indicative of an interferer signal,
wherein permitting transmission of a radio frequency transmit signal on the medium includes permitting transmission of a radio frequency transmit signal on the medium in response to the first autocorrelation value indicating activity on the medium either
does not include the signal of interest, or
includes the signal of interest when the second autocorrelation value and the third autocorrelation value both indicate activity on the medium includes an interferer signal, and
wherein preventing transmission of a radio frequency transmit signal includes preventing transmission of a radio frequency transmit signal on the medium in response to the first autocorrelation value indicating activity on the medium includes the signal of interest when both the second autocorrelation value and the third autocorrelation value indicate activity on the medium does not include an interferer signal.

8. The method of claim 1, wherein:
monitoring the first autocorrelation value includes determining whether the first autocorrelation value at least meets a first threshold; and
monitoring the second autocorrelation value includes determining whether the second autocorrelation value at least meets a second threshold.

9. The method of claim 8, wherein:
the first threshold includes a first autocorrelation count; and
the second threshold includes a second autocorrelation count.

10. The method of claim 1, wherein:
monitoring the first autocorrelation value includes determining whether the first autocorrelation value meets a first threshold for a first time interval; and
monitoring the second autocorrelation value includes determining whether the second autocorrelation value meets a second threshold for a second time interval.

11. The method of claim 1, further including:
autocorrelating samples to produce a third autocorrelation value indicative of autocorrelation computed with a third delay different from the first delay and different from the second delay; and
monitoring the third autocorrelation value to determine whether the third autocorrelation value is indicative of an interferer signal,
wherein preventing transmission of a radio frequency transmit signal includes preventing transmission of a radio frequency transmit signal on the medium in response to the first autocorrelation value indicating activity on the medium includes the signal of interest when both the second autocorrelation value and the third autocorrelation value indicate activity on the medium does not include an interferer signal,
wherein monitoring the first autocorrelation value includes determining whether the first autocorrelation value meets a first threshold,
wherein monitoring the second autocorrelation value includes determining whether the second autocorrelation value meets a second threshold, and
wherein monitoring the third autocorrelation value includes determining whether the third autocorrelation value meets a third threshold.

12. The method of claim 11, wherein:
the first threshold includes a first autocorrelation count;

the second threshold includes a second autocorrelation count; and the third threshold includes a third autocorrelation count.

13. The method of claim 11, wherein:

monitoring the first autocorrelation value includes determining whether the first autocorrelation value meets the first threshold for at least substantially a first time interval;

monitoring the second autocorrelation value includes determining whether the second autocorrelation value meets the second threshold for a second time interval; and monitoring the third autocorrelation value includes determining whether the third autocorrelation value meets the third threshold for a third time interval.

14. A method of controlling access to a wireless communications medium, the method comprising:

sampling radio frequency activity on the medium;

autocorrelating samples to produce a first autocorrelation value via a first autocorrelator, wherein the first autocorrelation value is indicative of autocorrelation computed with a first delay matching periodicity of a signal of interest;

monitoring the first autocorrelation value to determine whether the first autocorrelation value meets a first threshold for a first time interval;

autocorrelating samples to produce a second autocorrelation value via a second autocorrelator, wherein the second autocorrelator is indicative of autocorrelation computed with a second delay different from the first delay and matching periodicity of an interferer signal, wherein the interferer signal is a noise signal;

monitoring the second autocorrelation value to determine whether the second autocorrelation value meets a second threshold for a second time interval;

autocorrelating samples to produce a third autocorrelation value indicative of autocorrelation computed with a third delay different from the first delay and different from the second delay;

monitoring the third autocorrelation value to determine whether the third autocorrelation value meets a third threshold for a third time interval;

preventing transmission of a radio frequency transmit signal via radio frequency transmission control circuitry on the medium in response to the first autocorrelation value meeting the first threshold for the first time interval when (i) the second autocorrelation value has not met the second threshold for the second time interval and (ii) the third autocorrelation value has not met the third threshold for the third time interval, wherein the radio frequency transmission control circuitry comprises at least one of the first autocorrelator and the second autocorrelator;

permitting transmission of a radio frequency transmit signal on the medium in response to either the first autocorrelation value not meeting the first threshold for the first time interval, or the first autocorrelation value meeting the first threshold for the first time interval when (i) the second autocorrelation value has met the second threshold for the second time interval and (ii) the third autocorrelation value has met the third threshold for the third time interval;

generating a correlation value via an accumulator circuit of one of the first autocorrelator and the second autocorrelator;

generating a complex value based on the correlation value via a summation circuit of the one of the first autocorrelator and the second autocorrelator;

determining a magnitude of the complex value via a magnitude computation circuit of the one of the first autocorrelator and the second autocorrelator;

and generating one of the first autocorrelation value and the second autocorrelation value based on the magnitude via a filter of the one of the first autocorrelator and the second autocorrelator.

15. A wireless communication apparatus comprising:

a first autocorrelator configured to produce a first autocorrelation value indicative of autocorrelation of radio frequency samples computed with a first delay matching periodicity of a signal of interest;

a baseband processor and a media access controller configured to monitor the first autocorrelation value to determine whether the first autocorrelation value is indicative of the signal of interest; and a second autocorrelator configured to produce a second autocorrelation value indicative of autocorrelation computed with a second delay different from the first delay, wherein the baseband processor and the media access controller are configured to monitor the second autocorrelation value to determine whether the second autocorrelation value is indicative of an interferer signal, wherein the interferer signal is a noise signal, and wherein the baseband processor and media access controller are configured to prevent transmission of a radio frequency transmit signal on the medium in response to the first autocorrelation value indicating activity on the medium includes the signal of interest when the second autocorrelation value indicates activity on the medium does not include an interferer signal, and wherein the baseband processor and media access controller comprise at least one of the first autocorrelator and the second autocorrelator, and wherein one of the first autocorrelator and the second autocorrelator comprises:

an accumulator circuit configured to generate a correlation value, a summation circuit configured to generate a complex value based on the correlation value, a magnitude computation circuit configured to determine a magnitude of the complex value, and a filter configured to generate one of the first autocorrelation value and the second autocorrelation value based on the magnitude.

16. The wireless communication apparatus of claim 15, wherein the baseband processor and the media access controller are configured to permit transmission of a radio frequency transmit signal on the medium in response to the first autocorrelation value indicating activity on the medium does not include the signal of interest.

17. The wireless communication apparatus of claim 15, wherein the baseband processor and the media access controller are configured to permit a radio frequency transmit signal on the medium in response to the first autocorrelation value indicating activity on the medium includes the signal of interest when the second autocorrelation value indicates activity on the medium includes an interferer signal.

18. The wireless communication apparatus of claim 15, wherein the baseband processor and the media access controller are configured to permit transmission of a radio frequency transmit signal on the medium in response to the first autocorrelation value indicating that activity on the medium either (i) does not include the signal of interest or (ii) includes the signal of interest when the second autocorrelation value indicates that activity on the medium includes an interferer signal.

19. The wireless communication apparatus of claim 15, wherein the baseband processor and the media access controller are configured to:
produce a third autocorrelation value indicative of autocorrelation computed with a third delay different from the first delay and different from the second delay;
monitor the third autocorrelation value to determine whether the third autocorrelation value is indicative of an interferer signal; and
permit transmission of a radio frequency transmit signal on the medium in response to the first autocorrelation value indicating activity on the medium includes the signal of interest when both the second autocorrelation value and the third autocorrelation value indicate activity on the medium does not include an interferer signal.

20. The wireless communication apparatus of claim 15, wherein:
monitoring the first autocorrelation value includes determining whether the first autocorrelation value meets a first threshold; and
monitoring the second autocorrelation value includes determining whether the second autocorrelation value meets a second threshold.

21. The wireless communication apparatus of claim 20, wherein:
the first threshold includes a first autocorrelation count; and
the second threshold includes a second autocorrelation count.

22. The wireless communication apparatus of claim 15, wherein:
monitoring the first autocorrelation value includes determining whether the first autocorrelation value meets a first threshold for a first time interval; and
monitoring the first autocorrelation value includes determining whether the second autocorrelation value meets a second threshold for a second time interval.

23. The wireless communication apparatus of claim 15, wherein the baseband processor and the media access controller are configured to:
produce a third autocorrelation value indicative of autocorrelation computed with a third delay different from the first delay and different from the second delay;
monitor the third autocorrelation value to determine whether the third autocorrelation value is indicative of an interferer signal; and
prevent transmission of a radio frequency transmit signal on the medium in response to the first autocorrelation value indicating activity on the medium includes the signal of interest when both the second autocorrelation value and the third autocorrelation value indicate activity on the medium does not include an interferer signal,
wherein monitoring the first autocorrelation value includes determining whether the first autocorrelation value meets a first threshold,
wherein monitoring the second autocorrelation value to includes determining whether the second autocorrelation value meets a second threshold, and
wherein monitoring the third autocorrelation value to includes determining whether the third autocorrelation value meets a third threshold.

24. The wireless communication apparatus of claim 23, wherein:
the first threshold includes a first autocorrelation count;
the second threshold includes a second autocorrelation count; and
the third threshold includes a third autocorrelation count.

25. The wireless communication apparatus of claim 23, wherein:
monitoring the first autocorrelation value includes determining whether the first autocorrelation value meets a first threshold for a first time interval;
monitoring the second autocorrelation value includes determining whether the second autocorrelation value meets a second threshold for a second time interval; and
monitoring the third autocorrelation value includes determining whether the third autocorrelation value meets a third threshold for a third time interval.

26. The wireless communication apparatus of claim 15, further including:
a radio frequency transceiver; and
an antenna.

27. A wireless communication apparatus comprising:
means for producing a first autocorrelation value indicative of autocorrelation of radio frequency samples computed with a first delay matching periodicity of a signal of interest;
means for monitoring the first autocorrelation value to determine whether the first autocorrelation value is indicative of the signal of interest;
means for producing a second autocorrelation value indicative of autocorrelation computed with a second delay different from the first delay;
means for monitoring the second autocorrelation value to determine whether the second autocorrelation value is indicative of an interferer signal, wherein the interferer signal is a noise signal; and
means for preventing transmission of a radio frequency transmit signal on the medium in response to the first autocorrelation value indicating activity on the medium includes the signal of interest when the second autocorrelation value indicates activity on the medium does not include an interferer signal,
wherein the means for preventing transmission of a radio frequency transmit signal on the medium comprises at least one of the means for producing the first autocorrelation value and the means for producing the second autocorrelation value, and wherein one of the means for producing the first autocorrelation value and the means for producing the second autocorrelation value comprises:
accumulator means for generating a correlation value,
summation means for generating a complex value based on the correlation value,
computation means for determining a magnitude of the complex value,
and filter means for generating one of the first autocorrelation value and the second autocorrelation value based on the magnitude.

28. The wireless communication apparatus of claim 27, further including means for permitting transmission of a radio frequency transmit signal on the medium in response to the first autocorrelation value indicating activity on the medium does not include the signal of interest.

29. The wireless communication apparatus of claim 27, further including means for permitting a radio frequency transmit signal on the medium in response to the first autocorrelation value indicating activity on the medium includes the signal of interest when the second autocorrelation value indicates activity on the medium includes an interferer signal.

30. The wireless communication apparatus of claim 27, further including means for permitting transmission of a radio frequency transmit signal on the medium in response to the first autocorrelation value indicating that activity on the medium either (i) does not include the signal of interest or (ii) includes the signal of interest when the second autocorrelation value indicates activity on the medium includes an interferer signal.

31. The wireless communication apparatus of claim 27, further including:
   means for producing a third autocorrelation value indicative of autocorrelation computed with a third delay different from the first delay and different from the second delay;
   means for monitoring the third autocorrelation value to determine whether the third autocorrelation value is indicative of an interferer signal; and
   means for permitting transmission of a radio frequency transmit signal on the medium in response to the first autocorrelation value indicating activity on the medium includes the signal of interest when both the second autocorrelation value and the third autocorrelation value indicate activity on the medium does not include an interferer signal.

32. The wireless communication apparatus of claim 27, further including:
   means for determining whether the first autocorrelation value meets a first threshold; and
   means for determining whether the second autocorrelation value meets a second threshold.

33. The wireless communication apparatus of claim 32, wherein:
   the first threshold includes a first autocorrelation count; and
   the second threshold includes a second autocorrelation count.

34. The wireless communication apparatus of claim 27, wherein:
   the means for monitoring the first autocorrelation value determines whether the first autocorrelation value meets a first threshold for a first time interval; and
   the means for monitoring the second further determines whether the second autocorrelation value meets a second threshold for a second time interval.

35. The wireless communication apparatus of claim 27, further including:
   means for producing a third autocorrelation value indicative of autocorrelation computed with a third delay different from the first delay and different from the second delay;
   means for monitoring the third autocorrelation value to determine whether the third autocorrelation value is indicative of an interferer signal;
   means for preventing transmission of a radio frequency transmit signal on the medium in response to the first autocorrelation value indicating activity on the medium includes the signal of interest when both the second autocorrelation value and the third autocorrelation value indicate activity on the medium does not include an interferer signal;
   first means for determining whether the first autocorrelation value meets a first threshold;
   second means for determining whether the second autocorrelation value meets a second threshold; and
   third means for determining whether the third autocorrelation value meets a third threshold.

36. The wireless communication apparatus of claim 35, wherein:
   the first threshold includes a first autocorrelation count;
   the second threshold includes a second autocorrelation count; and
   the third threshold includes a third autocorrelation count.

37. The wireless communication apparatus of claim 35, wherein:
   the first means for determining determines whether the first autocorrelation value meets the first threshold for at least substantially a first time interval;
   the second means for determining determines whether the second autocorrelation value meets the second threshold for a second time interval; and
   the third means for determining determines whether the third autocorrelation value meets the third threshold for a third time interval.

38. The wireless communication apparatus of claim 27, further including:
   means for transmitting and receiving radio frequency information; and
   means for radiating and for receiving radio waves.

39. The method of claim 1, wherein the first autocorrelation value is monitored independent of the second autocorrelation value to determine whether the first autocorrelation value is indicative of the signal of interest.

40. The method of claim 1, wherein the second autocorrelation value is monitored independent of the first autocorrelation value to determine whether the second autocorrelation value is indicative of the interferer signal.

41. The method of claim 1, wherein the signal of interest is a jam signal.

42. The method of claim 1, wherein the signal of interest is a carrier sense multiple access jam signal.

43. The method of claim 42, wherein:
   the sampling of the radio frequency activity is performed by a first station;
   the jam signal is transmitted from a second station; and
   transmission of the radio frequency transmit signal is prevented by the first station based on the first autocorrelation value.

44. The method of claim 5, further comprising:
   counting consecutive clock cycles that the first autocorrelation value is greater than or equal to a first threshold to generate a first count;
   counting consecutive clock cycles that the third autocorrelation value is greater than or equal to a second threshold to generate a second count;
   counting consecutive clock cycles that the first autocorrelation value is less than a third threshold to generate a third count;
   counting consecutive clock cycles that the third autocorrelation value is less than a fourth threshold to generate a fourth count; and
   preventing the transmission of the radio frequency transmit signal based on the first count, the second count, the third count, and the fourth count.

45. The wireless communications apparatus of claim 15, wherein the signal of interest is a jam signal.

46. The wireless communications apparatus of claim 45, wherein the signal of interest is a carrier sense multiple access jam signal.

47. The method of claim 1, wherein:
   the transmission of the radio frequency transmit signal on the medium is prevented when a symbol error is not detected; and the transmission of the radio frequency transmit signal on the medium is permitted when a symbol error is detected.

48. The method of claim 1, wherein the transmission of the radio frequency transmit signal on the medium is permitted when the first autocorrelation value exceeds a first threshold prior to a transmission period of the signal of interest lapsing.

49. The method of claim 11, wherein the transmission of the radio frequency transmit signal on the medium is permitted prior to a transmission period of the signal of interest lapsing and when (i) the first autocorrelation value exceeds the first threshold and (ii) the third autocorrelation value exceeds the second threshold.

50. The method of claim 49, wherein the signal of interest is a jam signal.

51. The wireless communication apparatus of claim 15, wherein the baseband processor and the media access controller comprise:
    the first autocorrelator comprising
        a first conjugate device configured to generate a first conjugate value based on the radio frequency samples,
        a first multiplier configured to generate a first complex conjugate value based on the first conjugate value,
        a first accumulator circuit configured to generate a first correlation value based on the first conjugate value and the first delay,
        a first summation circuit configured to generate a first complex value based on the first correlation value,
        a first magnitude computation circuit configured to determine a first magnitude of the first complex value, and
        a first filter configured to generate the first autocorrelation value that is indicative of the autocorrelation of the radio frequency samples; and
    the second autocorrelator.

52. The wireless communication apparatus of claim 51, wherein the second autocorrelator comprises:
    a second conjugate device configured to generate a second conjugate value based on the radio frequency samples;
    a second multiplier configured to generate a second complex conjugate value based on the first conjugate value;
    a second accumulator circuit configured to generate a second correlation value based on the second conjugate value and the second delay;
    a second summation circuit configured to generate a second complex value based on the second correlation value;
    a second magnitude computation circuit configured to determine a second magnitude of the second complex value; and
    a second filter configured to generate the second autocorrelation value that is indicative of the autocorrelation computed with the second delay.

53. The wireless communication apparatus of claim 52, wherein:
    the first accumulator circuit is configured to generate the first correlation based on N of the radio frequency samples, wherein N is an integer greater than 1;
    the second accumulator circuit is configured to generate the second correlation based on M of the radio frequency samples, wherein M is an integer greater than 1;
    the M radio frequency samples include X of the N radio frequency samples, wherein X is an integer less than N; and
    the M radio frequency samples include Y samples that are not included in the N radio frequency samples, where Y is an integer less than M.

54. A wireless communication apparatus comprising:
    a first autocorrelator configured to produce a first autocorrelation value indicative of autocorrelation of radio frequency samples computed with a first delay matching periodicity of a signal of interest;
    a baseband processor and a media access controller configured to monitor the first autocorrelation value to determine whether the first autocorrelation value is indicative of the signal of interest; and
    a second autocorrelator configured to produce a second autocorrelation value indicative of autocorrelation computed with a second delay different from the first delay,
    wherein the baseband processor and the media access controller are configured to monitor the second autocorrelation value to determine whether the second autocorrelation value is indicative of an interferer signal, wherein the interferer signal is a noise signal,
    wherein the baseband processor and the media access controller are configured to prevent transmission of a radio frequency transmit signal on the medium in response to the first autocorrelation value indicating activity on the medium includes the signal of interest when the second autocorrelation value indicates activity on the medium does not include an interferer signal, and
    wherein the baseband processor and the media access controller comprise the first autocorrelator, and wherein the first autocorrelator comprises:
    an accumulator circuit configured to generate a correlation value,
    a summation circuit configured to generate a complex value based on the correlation value,
    a magnitude computation circuit configured to determine a magnitude of the complex value, and
    a filter configured to generate the first autocorrelation value based on the magnitude.

55. The wireless communication apparatus of claim 54, wherein the autocorrelator further comprises:
    a conjugate device configured to generate a conjugate value based on the radio frequency samples; and
    a multiplier configured to generate a complex conjugate value based on the conjugate value,
    wherein the accumulator circuit is configured to generate the correlation value based on the conjugate value and the delay.

56. A wireless communication apparatus comprising:
    a first autocorrelator configured to produce a first autocorrelation value indicative of autocorrelation of radio frequency samples computed with a first delay matching periodicity of a signal of interest;
    a baseband processor and a media access controller configured to monitor the first autocorrelation value to determine whether the first autocorrelation value is indicative of the signal of interest; and
    a second autocorrelator configured to produce a second autocorrelation value indicative of autocorrelation computed with a second delay different from the first delay,
    wherein the baseband processor and the media access controller are configured to monitor the second autocorrelation value to determine whether the second autocorrelation value is indicative of an interferer signal, wherein the interferer signal is a noise signal,
    wherein the baseband processor and the media access controller are configured to prevent transmission of a radio frequency transmit signal on the medium in response to the first autocorrelation value indicating activity on the medium includes the signal of interest when the second autocorrelation value indicates activity on the medium does not include an interferer signal, and wherein the baseband processor and the media access controller comprise the second autocorrelator, and wherein the second autocorrelator comprises:

an accumulator circuit configured to generate a correlation value, a summation circuit configured to generate a complex value based on the correlation value, a magnitude computation circuit configured to determine a magnitude of the complex value, and a filter configured to generate the second autocorrelation value based on the magnitude.

57. The wireless communication apparatus of claim 56, wherein the second autocorrelator further comprises:

a conjugate device configured to generate a conjugate value based on the radio frequency samples; and a multiplier configured to generate a complex conjugate value based on the conjugate value, wherein the accumulator circuit is configured to generate the correlation value based on the conjugate value and the delay.

* * * * *

UNITED STATES PATENT AND TRADEMARK OFFICE
CERTIFICATE OF CORRECTION

PATENT NO. : 8,149,863 B1
APPLICATION NO. : 11/351936
DATED : April 3, 2012
INVENTOR(S) : Atul Salhotra et al.

Page 1 of 1

It is certified that error appears in the above-identified patent and that said Letters Patent is hereby corrected as shown below:

Title Page, item [75] change Inventor Name from "Sahotra" to "Salhotra"

Signed and Sealed this
Twenty-ninth Day of May, 2012

David J. Kappos
*Director of the United States Patent and Trademark Office*